United States Patent
Shiozaki et al.

(12)

(10) Patent No.: US 8,568,950 B2
(45) Date of Patent: Oct. 29, 2013

(54) POLYESTER RESIN FOR TONER, ELECTROSTATIC-IMAGE-DEVELOPING TONER, ELECTROSTATIC IMAGE DEVELOPER, TONER CARTRIDGE, PROCESS CARTRIDGE, IMAGE FORMING APPARATUS, AND IMAGE FORMING METHOD

(71) Applicant: Fuji Xerox Co., Ltd., Tokyo (JP)

(72) Inventors: Hirofumi Shiozaki, Kanagawa (JP); Sumiaki Yamasaki, Kanagawa (JP); Satoshi Hiraoka, Kanagawa (JP); Yuki Sasaki, Kanagawa (JP); Susumu Yoshino, Kanagawa (JP); Hirotaka Matsuoka, Kanagawa (JP); Emi Miyata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/626,433

(22) Filed: Sep. 25, 2012

(65) Prior Publication Data

US 2013/0022908 A1    Jan. 24, 2013

Related U.S. Application Data

(63) Continuation-in-part of application No. 13/296,494, filed on Nov. 15, 2011.

(30) Foreign Application Priority Data

Apr. 15, 2011 (JP) .................. 2011-091570
Apr. 16, 2012 (JP) .................. 2012-093314

(51) Int. Cl.
    *G03G 9/087*    (2006.01)

(52) U.S. Cl.
    USPC .............. 430/109.4; 430/123.5; 528/176; 528/193; 528/194; 399/111; 399/252; 399/262

(58) Field of Classification Search
    USPC ............ 528/176, 193, 194; 430/123.5, 109.4; 399/111, 262, 252
    See application file for complete search history.

(56) References Cited

U.S. PATENT DOCUMENTS

2003/0203301 A1    10/2003    Iga
2009/0156784 A1*   6/2009     Kubo et al. ............... 530/211

FOREIGN PATENT DOCUMENTS

| JP | 2006-285195   | 10/2006 |
| JP | 2006-292820   | * 10/2006 |
| JP | A-2006-292820 | 10/2006 |
| JP | A-2007-137910 | 6/2007 |
| JP | 2008-185681   | 8/2008 |
| JP | B2-4505738    | 7/2010 |

OTHER PUBLICATIONS

Translation of JP 2006-292820 published on Oct. 2006.*
Jul. 2, 2012 Extended European Search Report issued in European Application No. 11 19 0248.2.
U.S. Appl. No. 13/296,494 in the name of Yamasaki et al, filed on Nov. 15, 2011.

* cited by examiner

*Primary Examiner* — Peter Vajda
(74) *Attorney, Agent, or Firm* — Oliff & Berridge, PLC

(57) ABSTRACT

There is provided a polyester resin for a toner, including: a polycondensate of a polyvalent carboxylic acid component and a polyhydric alcoholic component, wherein the polyhydric alcoholic component contains a rosin diol represented by the following Formula (1) and a content of the rosin diol is 80 mole % to 100 mole % based on the total polyhydric alcoholic component.

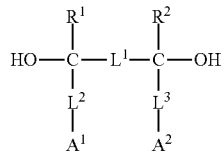

(1)

wherein, each of $R^1$ and $R^2$ independently represents a hydrogen atom or a methyl group; $L^1$ represents a divalent linking group having the following Formula (I); each of $L^2$ and $L^3$ independently represents a divalent linking group selected from the group consisting of carbonyl groups, carboxyl groups, ether groups, sulfonyl groups, substituted or unsubstituted chained alkylene groups, substituted or unsubstituted cyclic alkylene groups, substituted or unsubstituted arylene groups, and combinations thereof; and each of $A^1$ and $A^2$ independently represents a rosin ester group.

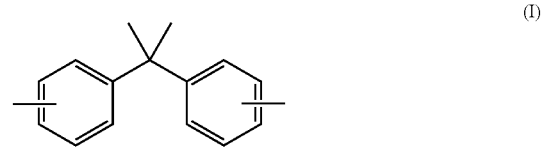

(I)

14 Claims, 2 Drawing Sheets

POLYESTER RESIN FOR TONER, ELECTROSTATIC-IMAGE-DEVELOPING TONER, ELECTROSTATIC IMAGE DEVELOPER, TONER CARTRIDGE, PROCESS CARTRIDGE, IMAGE FORMING APPARATUS, AND IMAGE FORMING METHOD

CROSS-REFERENCE TO RELATED APPLICATIONS)

This is a Continuation-In-Part application of U.S. application Ser. No. 13/296,494 filed in the United States on Nov. 15, 2011.

This application claims priority under 35 U.S.C. §119 from Japanese Patent Application No. 2012-093314 filed on Apr. 16, 2012.

BACKGROUND

1. Field

The present invention relates to a polyester resin for a toner, an electrostatic-image-developing toner, an electrostatic image developer, a toner cartridge, a process cartridge, an image forming apparatus, and an image forming method.

2. Description of the Related Art

Japanese Patent Application Laid-Open No. 2006-285195 discloses an electrostatic-image-developing toner containing a copolymerized polyester resin serving as a binder and obtained by copolymerizing an acid component and a glycol component in the presence of a catalyst containing at least an aluminum compound, in which 50 mole % to 100 mole % of an aromatic dicarboxylic acid, 0 mole % to 50 mole % of other dicarboxylic acids and 0 mole % to 15 mole % of tri- or higher functional polyvalent carboxylic acid are present as the acid component, and 5 mole % to 100 mole % of an adduct of alkylene oxide to bisphenol A and/or bisphenol F, 0 mole % to 95 mole % of other glycols and 0 mole % to 15 mole % of tri- or higher functional polyhydric alcohol are present as the glycol component.

Japanese Patent Application Laid-Open No. 2008-185681 discloses a polyester for a toner obtained by polycondensing an alcoholic component containing 60 mole % or more of an adduct of ethylene oxide to bisphenol A with a carboxylic acid component, and having a softening temperature (Tm) of 130° C. to 160° C., in which a methyl ethyl ketone insoluble component is present in an amount of (Tm−110)×1.1% by weight to (Tm−100)×3% by weight.

An object of the present invention is to provide a polyester resin for a toner, from which a toner having both low-temperature fixability and heat resistance is obtained.

SUMMARY (1) A polyester resin for a toner, including: a polycondensate of a polyvalent carboxylic acid component and a polyhydric alcoholic component, wherein the polyhydric alcoholic component contains a rosin dial represented by the following Formula (1) and a content of the rosin diol is 80 mole % to 100 mole % based on the total polyhydric alcoholic component:

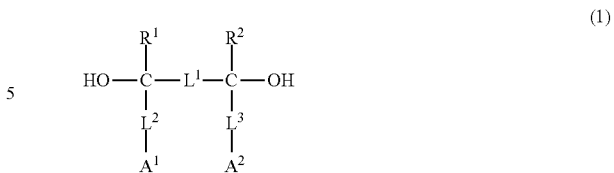

wherein each of $R^1$ and $R^2$ independently represents a hydrogen atom or a methyl group; $L^1$ represents a divalent linking group having the following Formula (I); each of $L^2$ and $L^3$ independently represents a divalent linking group selected from the group consisting of carbonyl groups, carboxyl groups, ether groups, sulfonyl groups, substituted or unsubstituted chained alkylene groups, substituted or unsubstituted cyclic alkylene groups, substituted or unsubstituted arylene groups, and combinations thereof; and each of $A^1$ and $A^2$ independently represents a rosin ester group.

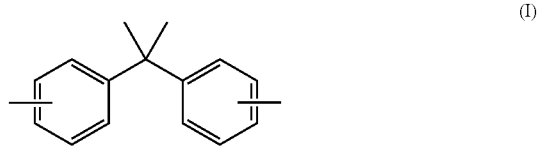

BRIEF DESCRIPTION OF DRAWINGS

Exemplary embodiments of the present invention will be described in detail based on the following figures, wherein.

Figure 1:
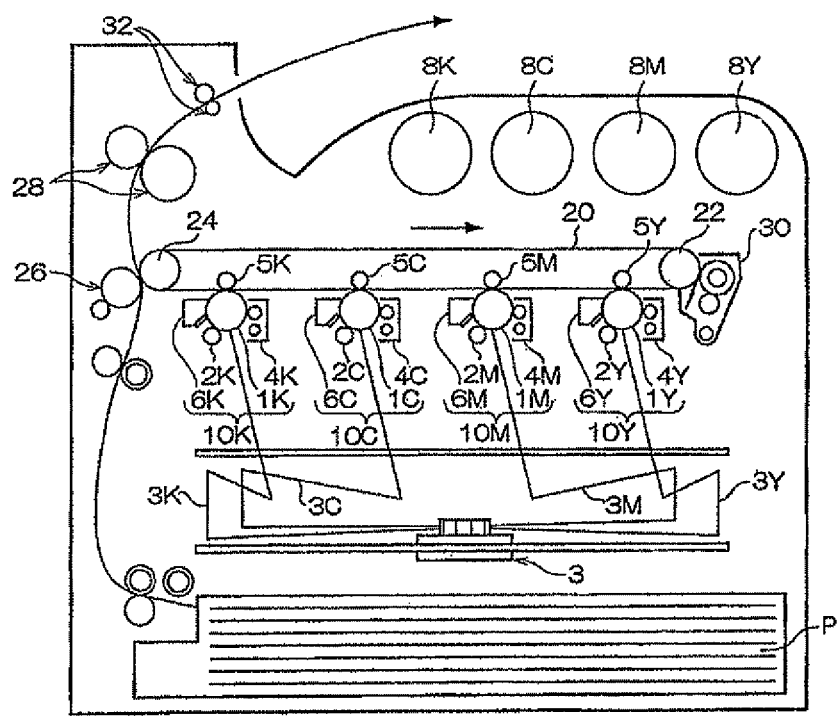
FIG. 1 is a schematic view illustrating the constitution of an example of an image forming apparatus according to the present embodiment.

Hereinafter, an embodiment which is an example of the present invention will be described in detail.

DETAILED DESCRIPTION OF EXEMPLARY EMBODIMENTS

[Polyester Resin for Toner]

First, according to a first aspect of the present embodiment, the polyester resin for a toner according to the present embodiment may include a polycondensate of a polyvalent carboxylic acid component and a polyhydric alcoholic component wherein the content of the rosin diol represented by the following Formula (1) (hereinafter, referred to as bisphenol A type rosin diol) is from 80 mole % to 100 mole % based on the total polyhydric alcoholic component.

According to a second aspect, the polyester resin for a toner may include a polycondensate of a polyvalent carboxylic acid component, and polyhydric alcoholic components including a bisphenol A type rosin diol and one or more of the aromatic alcohol having the following Formula (I), the aromatic alcohol having the following Formula (II) and the aromatic alcohol having the following Formula (III) (hereinafter, referred to as specific aromatic alcohol) except for the bisphenol A type rosin diol, wherein the content of the bisphenol A type rosin diol and the specific aromatic alcohol as a sum is in the range of from 80 mole % to 100 mole % based on the total polyhydric alcoholic component, and the content of the bisphenol A type rosin diol is in the range of from 10 mole % to 80 mole % based on the total polyhydric alcoholic component.

In addition, the "sum" indicates the total content of the bisphenol A type rosin diol and the specific aromatic alcohol.

Herein, when the polyester resin having a rosin structure and obtained by introducing the rosin structure into the alcoholic component to subject the mixture to polycondensation with the carboxylic acid component is used as an electrostatic-image-developing toner (hereinafter, referred to as toner in some cases), it is inferred that the toner tends to have excellent electrostatic properties.

Meanwhile, when the polyester resin is used as a toner, it tends to be difficult for the toner to have low fixability and heat resistance, and in order to obtain a toner having the properties at the same time, it is inferred that the glass transition temperature is increased while maintaining the softening temperature of the polyester resin.

This is because it is inferred that low-temperature fixability results from the softening temperature of the polyester resin, and heat resistance results from the glass transition temperature of the polyester resin.

Accordingly, the polyester resin for a toner according to the present embodiment becomes a polyester resin, from which a toner having low-temperature fixability and heat resistance is obtained by the configuration as described above.

The reason for this is unclear but is inferred as follows.

As for the polyester resin for a toner according to the present embodiment, in the first aspect, the bisphenol A type rosin diol is included in the polyhydric alcoholic component, and in the second aspect, the bisphenol A type rosin diol and the specific aromatic alcohol are included in the polyhydric alcoholic component, as represented by the following (i) and (ii).

That is, any of the first and second aspects uses, as a polycondensation component, a polyhydric alcoholic component including an alcohol having a structure where two aromatic rings such as the following Formulas (I) to (III) are bonded directly or through divalent linking groups.

Thus, the polyester resin for a toner according to the present embodiment becomes a polyester resin for a toner having a structure where two aromatic rings are bonded to each other in a main chain thereof in any of the first and second embodiments.

As a result, in the polyester resin for a toner according to the present embodiment, weak interaction acting between aromatic rings, which a polyhydric alcohol included in a polyhydric alcoholic component has, occurs at a plurality of points, and thus it is inferred that the glass transition temperature of the entire polyester resin is increased.

Meanwhile, since the interaction is weak, the interaction tends to be offset by the action of the heat when applied at a temperature equivalent to or higher than the glass transition temperature, and not to act, and as a result, it is inferred that the softening temperature tends to be suppressed from being increased and to be maintained.

The polyester resin for a toner according to the present embodiment has a structure where two aromatic rings are bonded to each other in a main chain thereof to suppress resins from being entangled with each other, and when the temperature exceeds the glass transition temperature, molecular chains of the resin are easily dissociated, and as a result, it is inferred that the softening temperature tends to be suppressed from being increased and to be maintained.

As stated above, it is inferred that a toner having low-temperature fixability and heat resistance is obtained from the polyester resin for a toner according to the present embodiment.

Hereinafter, the polyester resin for a toner according to the present embodiment will be described in detail.

(Polyhydric Alcoholic Component)

First, as the polyhydric alcoholic component, the following aspect is inferred as the first aspect.

(i) A polyhydric alcoholic component wherein (a) the content of the bisphenol A type rosin diol is from 80 mole % to 100 mole % based on the total polyhydric alcoholic component and (b) a specific aromatic alcohol is not included.

In the polyhydric alcoholic component in (i), (a) the content of the bisphenol A type rosin diol is preferably from 80 mole % to 100 mole % and more preferably from 90 mole % to 100 mole % based on the total polyhydric alcoholic component.

Next, the following aspect is inferred as the polyhydric alcoholic component in the second aspect.

(ii) A polyhydric alcoholic component including (a) a bisphenol A type rosin dial and (b) one or more of specific aromatic alcohols, wherein the content of (a) the bisphenol A type rosin diol and (b) the specific aromatic alcohol as a sum is from 80 mole % to 100 mole % based on the total polyhydric alcoholic component, and the content of (a) the bisphenol A type rosin diol is from 10 mole % to 80 mole % based on the total polyhydric alcoholic component.

In the polyhydric alcoholic component in (ii), the content of (a) the bisphenol A type rosin diol and (b) the specific aromatic alcohol as a sum is preferably from 80 mole % to 100 mole %, and more preferably from 90 mole % to 100 mole % based on the total polyhydric alcoholic component, and the content of the bisphenol A type rosin dial is from 10 mole % to 80 mole %, and preferably from 50 mole % to 80 mole % based on the total polyhydric alcoholic component.

In the aspects of (i) and (ii), (c) a polyhydric alcohol having none of the following Formulas (I) to (III) may be used in combination.

Hereinafter, each of alcohols (a) to (e) will be described in detail.

(c) Other alcohols having none of the following Formulas (I) to (III) may be used in combination in a range of the content of (a) and (b) as described above.

-(a) Bisphenol A Type Rosin Dial-

The bisphenol A type rosin diol has the following Formula (I) and is an alcoholic compound that contains two rosin ester groups in one molecule.

In the present embodiment, the rosin ester group refers to a moiety in which a hydrogen atom is excluded from a carboxylic group included in a rosin.

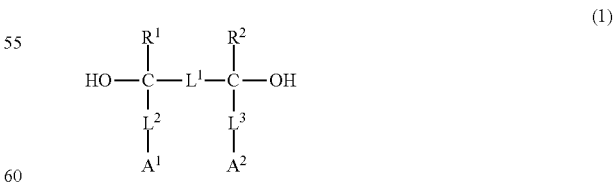

(1)

In Formula (1), each of $R^1$ and $R^2$ independently represents a hydrogen atom or a methyl group. $L^1$ represents a divalent linking group having the following Formula (I), and each of $L^2$ and $L^3$ independently represents a divalent linking group selected from the group consisting of carbonyl groups, carboxyl groups, ether groups, sulfonyl groups, chained alkylene groups which may be substituted or unsubstituted, cyclic alkylene groups which may be substituted or unsubstituted, arylene groups which may be substituted or unsubstituted, and combinations thereof. Each of $A^1$ and $A^2$ independently represents a rosin ester group.

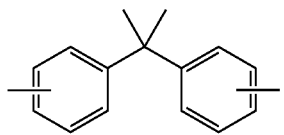
(I)

Appropriate examples of the divalent linking group represented by $L^1$ include the following Formulas (2) and (3), but the present embodiment is not limited thereto.

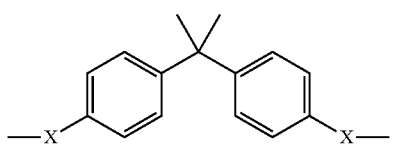
(2)

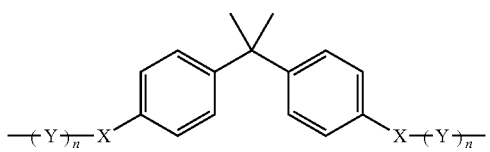
(3)

In Formulas (2) and (3), X represents an ether group and an ester group, and an ether group is more preferred.

In Formula (3), Y represents an oxyalkylene group.

The oxyalkylene group may have 2 to 7 carbon atoms, preferably 2 to 5 carbon atoms, and more preferably 2 carbon atoms.

n represents an integer of 1 or greater.

The chained alkylene groups represented by $L^2$ and $L^3$ may be, for example, $C_1$-$C_{10}$ alkylene groups.

The cyclic alkylene groups represented by $L^2$ and $L^3$ may be, for example, $C_3$-$C_7$ cyclic alkylene groups.

The arylene groups represented by $L^2$ and $L^3$ may be, for example, phenylene, naphthylene and anthracene groups.

Examples of substituents of the chained alkylene groups, the cyclic alkylene groups and the arylene groups represented by $L^2$ and $L^3$ include a $C_1$-$C_8$ alkyl group, an aryl group, and the like. A linear, branched or cyclic alkyl group is preferred. Specific examples thereof include a methyl group, a ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclopentyl group, a cyclohexyl group, a phenyl group and the like.

-(b) Specific Aromatic Alcohol- (b) The specific aromatic alcohol includes (b-1) a specific aromatic alcohol having a rosin ester group and (b-2) a specific aromatic alcohol having no rosin ester group.

Examples of the specific aromatic alcohol having (b-1) the rosin ester group include a rosin diol represented by Formula (4).

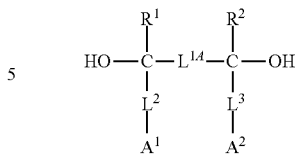
(4)

In Formula (1), each of $R^1$ and $R^2$ independently represents a hydrogen atom or a methyl group. $L^{14}$ represents a divalent linking group having the following Formula (II) or (III), and each of $L^2$ and $L^3$ independently represents a divalent linking group selected from the group consisting of carbonyl groups, carboxyl groups, ether groups, sulfonyl groups, chained alkylene groups which may be substituted or unsubstituted, cyclic alkylene groups which may be substituted or unsubstituted, arylene groups which may be substituted or unsubstituted, and combinations thereof. Each of $A^1$ and $A^2$ independently represents a rosin ester group.

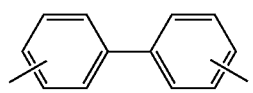
(II)

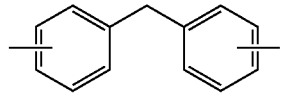
(III)

$R^1$, $R^2$, $L^2$, $L^3$, $A^1$ and $A^2$ are the same as $R^1$, $R^2$, $L^2$, $L^3$, $A^1$ and $A^2$ in Formula (1).

The divalent linking group represented by $L^{14}$ is a linking group having Formulas (II) or (III), and appropriate examples thereof include the following Formulas (5) to (8), but the present embodiment is not limited thereto.

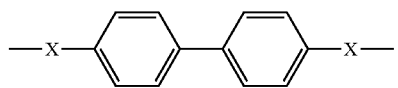
(5)

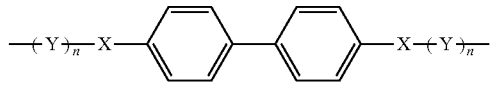
(6)

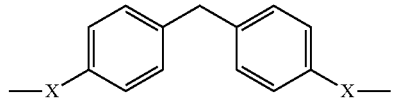
(7)

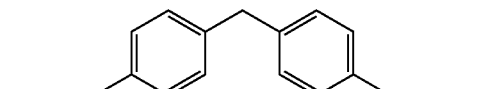
(8)

In Formulas (5) to (8), X, Y and n are the same as X, Y and n in Formulas (2) and (3).

A specific aromatic alcohol having Formula (II) and a rosin ester group is referred to as a biphenyl type rosin diol, and a specific aromatic alcohol having Formula (III) and a rosin ester group is referred to as a bisphenol F type rosin dial.

(b-2) The specific aromatic alcohol having no rosin ester group has the following Formulas (I) to (III).

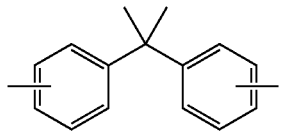
(I)

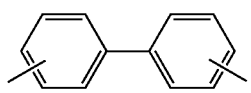
(II)

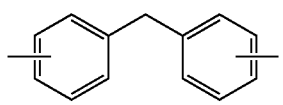
(III)

Specific examples thereof include bisphenol compounds, etherified diphenol, biphenyl type alcohol compounds, esterified benzene and etherified benzene.

Herein, the etherified diphenol refers to a dial obtained by the addition reaction of bisphenol A and an alkylene oxide.

Examples of the bisphenol compounds include bisphenol A, bisphenol F and bisphenol Z.

As the etherified diphenol, the alkylene oxide is ethylene oxide or propylene oxide, and the average number of moles of the alkylene oxide added is preferably in the range of from 2 moles to 16 moles per 1 mole of the bisphenol A, and specific examples thereof include an adduct of 2 moles of propylene oxide to bisphenol A and bisphenol A ethylene oxide.

Examples of the biphenyl type alcohol compound include 4-hydroxymethyl biphenyl and 4-(1-hydroxyethyl)biphenyl.

Of these, an adduct of 2 males of propylene oxide to bisphenol A and bisphenol A ethylene oxide are preferred, and an adduct of 2 moles of propylene oxide to bisphenol A is more preferred.

-(c) Polyhydric Alcohol Having None of Formulas (I) to (III)-

The polyhydric alcohol having none of Formulas (I) to (III) may or may not have a rosin ester group.

The polyhydric alcohol having none of Formulas (I) to (III) may be, for example, the following aliphatic diols and aromatic diols.

Specific examples of the aliphatic diols include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, dimerdiol, 3-hydroxy-2,2-dimethylpropyl-3-hydroxy-2,2-dimethylpropanoate, diethylene glycol, triethylene glycol, polyethylene glycol, dipropylene glycol, polypropylene glycol and the like, but are not limited thereto.

Examples of the aromatic diols include benzenedimethanol, salicyl alcohol and homovanillyl alcohol, but are not limited thereto.

Other examples of the tri- or higher valent alcohols having no structure where two aromatic rings are bonded to each other include glycerin, trimethylol ethane, trimethylol propane, pentaerythritol and the like.

The polyhydric alcohols may be used either alone or in combination of two or more thereof.

Herein, a synthesis method of the entire rosin diols will be described.

The rosin diol is synthesized by methods known in the art, for example, by the reaction of a difunctional epoxy compound and a rosin.

Hereinafter, the synthesis scheme of the rosin diol will be represented as an example.

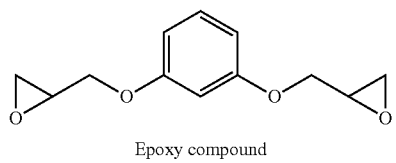
Epoxy compound

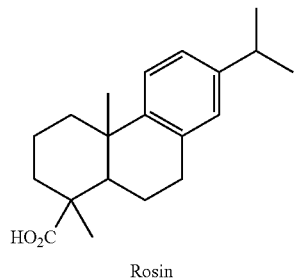
Rosin

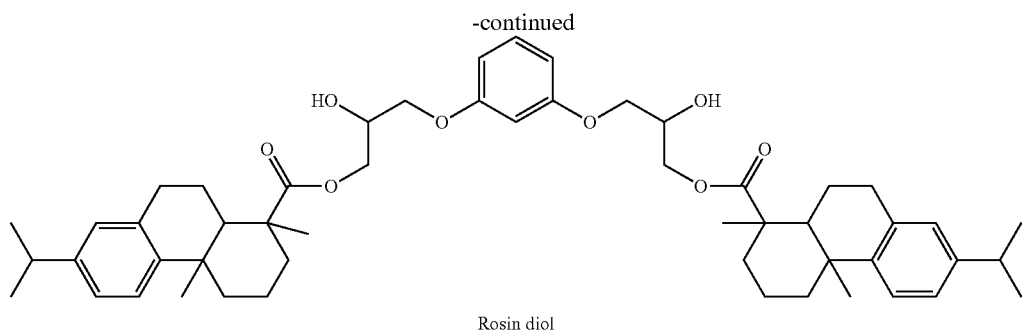

Rosin diol

The difunctional epoxy compound includes two epoxy groups in one molecule, and examples thereof include diglycidyl ethers of aromatic diols, diglycidyl ethers of aromatic dicarboxylic acids, diglycidyl ethers of aliphatic diols, diglycidyl ethers of alicyclic diols, alicyclic epoxides and the like.

Representative examples of the diglycidyl ethers of aromatic diols include diglycidyl ethers of bisphenol A, derivatives of bisphenol A, such as polyalkylene oxide adducts of bisphenol A, bisphenol F, derivatives of bisphenol F, such as polyalkylene oxide adducts of bisphenol F, bisphenol S, derivatives of bisphenol S, such as polyalkylene oxide adducts of bisphenol S, resorcinol, t-butylcatechol and biphenols as aromatic diol components.

Representative examples of the diglycidyl ethers of aromatic dicarboxylic acids include diglycidyl ethers of terephthalic acid, isophthalic acid and phthalic acid as aromatic dicarboxylic acid components.

Representative examples of the diglycidyl ethers of aliphatic diols include diglycidyl ethers of ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol as aliphatic diol components.

Representative examples of the diglycidyl ethers of alicyclic dials include hydrogenated bisphenol A, derivatives of hydrogenated bisphenol A, such as polyalkylene oxide adducts of hydrogenated bisphenol A, and cyclohexanedimethanol as alicyclic diol components.

Representative examples of the alicyclic epoxides include limonene dioxide.

The epoxy group-containing compound may be obtained, for example, by the reaction of a dial component and an epihalohydrin. A higher molecular weight of the epoxy group-containing compound can be accomplished by polycondensation depending on the ratio of the diol component to the epihalohydrin.

The reaction between the rosin and the difunctional epoxy compound is mainly carried out by the ring-opening reaction of the epoxy groups of the difunctional epoxy compound with the carboxyl group of the rosin. At this point, the reaction temperature is preferably a temperature equal to or higher than the melting temperatures of both of the constituent components, or a temperature where the mixing of both of the constituent components can be implemented. Specifically, the reaction temperature is typically from 60° C. to 200° C. During the reaction, a catalyst may be added to promote the ring-opening reaction of the epoxy groups.

Examples of catalysts include amines, such as ethylenediamine, trimethylamine, 2-methylimidazole and the like; quaternary ammonium salts, such as triethylammonium bromide, triethylammonium chloride, butyltrimethylammonium chloride and the like; triphenylphosphine and the like.

The reaction can be carried out by various methods. Generally, the reaction may be carried out in a batch manner. In this case, the rosin and the difunctional epoxy compound are put into a heatable flask equipped with a condenser, a stirrer, an inert gas introducing hole and a thermometer, the mixture is heat-melted, and the reaction mixture is appropriately sampled to trace the reaction. The progress of the reaction can be mainly confirmed by a reduction in acid value, and the reaction can be appropriately finished at or near the stoichiometric endpoint.

It is preferred to react the rosin and the difunctional epoxy compound in a molar ratio of from 1.5 to 2.5:1, preferably 1.8 to 2.2:1, and more preferably 1.85 to 2.1:1. If the rosin is less than 1.5 moles, the epoxy groups of the difunctional epoxy compound are left in the next step of the process for preparing polyester to cause a rapid increase in molecular weight, leading to a concern of gelation. In contrast, if the rosin is more than 2.5 moles, there may be a case that the rosin remains unreacted to cause deterioration in electrostatic properties due to an increase in acid value.

The rosin used in the present exemplary embodiment is a generic name for resin acids obtained from trees and is a naturally occurring substance that includes abietic acid, a kind of tricyclic diterpenes, and isomers thereof as major components. In addition to abietic acid, specific rosin components are palustric acid, neoabietic acid, pimaric acid, dehydroabietic acid, isopimaric acid, sandaracopimaric acid. The rosin used in the present exemplary embodiment is a mixture of these acids.

Rosins are largely divided into three kinds: tall rosins obtained from pulps as raw materials, gum rosins obtained from pine trees as raw materials, and wood rosins obtained from the roots of pine trees as raw materials, by collection methods of raw materials. The rosin used in the present exemplary embodiment is preferably a gum rosin and/or a tall rosin for their ease of purchase.

It is preferred to purify these rosins before use. A purified rosin can be obtained by removing high molecular weight substances thought to be derived from peroxides of resin acids and non-saponified substances included in unpurified rosins. Any purification methods known in the art can be used without particular limitation to purify rosins, and specific examples thereof include distillation recrystallization and extraction. Purification by distillation is preferred from an industrial viewpoint. A distillation method is usually selected taking into consideration the distillation time at a temperature of 200° C. to 300° C. and a pressure of 6.67 kPa or below. Recrystallization is performed, for example, by dissolving an unpurified rosin in a good solvent, partially removing the solvent to obtain a concentrated solution, and adding a poor solvent to the solution. Examples of such good solvents include: aromatic hydrocarbons, such as benzene, toluene and xylene; chlorinated hydrocarbons, such as chloroform; alcohols, such as lower alcohols; ketones, such as acetone; and acetates, such as ethyl acetate. Examples of such poor solvents include hydrocarbon-based solvents, such as n-hexane, n-heptane, cyclohexane and isooctane. According to an extraction method, an unpurified rosin is dissolved in alkaline water to prepare an alkaline aqueous solution, the alkaline aqueous solution is extracted with an organic solvent to remove non-saponified insoluble substances, and the aqueous layer is neutralized to obtain a purified rosin.

The rosin in the present exemplary embodiment may be a disproportionated rosin. The disproportionated rosin is obtained by heating a rosin including abietic acid as a major component in the presence of a disproportionation catalyst to eliminate unstable conjugated double bonds in the molecule. The disproportionated rosin is a mixture of dehydroabietic acid and dihydroabietic acid as major components.

The disproportionation catalyst may be any of those known in the art, for example: supported catalysts, such as palladium carbon, rhodium carbon and platinum carbon; metal powders, such as nickel and platinum powders; iodine; iodides, such as iron iodide; phosphorus-based compounds, and the like. Generally, the amount of the catalyst used is preferably from 0.01% by mass to 5% by mass, and more preferably 0.01% by mass to 1% by mass. The reaction temperature is preferably from 100° C. to 300° C., and more preferably 150° C. to 290° C. Further, in a method for controlling the amount of dehydroabietic acid, dehydroabietic acid may be isolated, for example, by a method in which an ethanolamine salt is crystallized from a disproportionated rosin [J. Org. Chem., 31, 4246 (1996)], and then added to a disproportionated rosin, which is prepared by heating in the presence of a disproportion catalyst, so as to achieve a desired amount of dehydroabietic acid.

The rosin in the present exemplary embodiment may be a hydrogenated rosin. The hydrogenated rosin contains tetrahydroabietic acid and dihydroabietic acid as major components, and may be obtained by eliminating unstable conjugated double bonds in the molecule. The hydrogenation is performed by heating a crude rosin under a hydrogen pressure of generally from 10 kg/cm$^2$ to 200 kg/cm$^2$, and preferably 50 kg/cm$^2$ to 150 kg/cm$^2$ in the presence of a hydrogenation catalyst. The hydrogenation catalyst may be any of those known in the art, for example: supported catalysts, such as palladium carbon, rhodium carbon and platinum carbon; metal powders, such as nickel and platinum powders; iodine; and iodides, such as iron iodide. The amount of the catalyst used to the rosin is generally from 0.01% by mass to 5% by mass, and preferably 0.01% by mass to 1.0% by mass. The reaction temperature is from 0° C. to 300° C., and preferably 150° C. to 290° C.

The disproportionated rosin and the hydrogenated rosin may be purified in the same manner as described above before or after disproportionation and hydrogenation, respectively.

The rosin in the present exemplary embodiment may be a polymerized rosin obtained by polymerizing a rosin, an unsaturated carboxylic acid-modified rosin obtained by adding unsaturated carboxylic acid to a rosin, or a phenol-modified rosin. Further, the unsaturated carboxylic acid used for preparing an unsaturated carboxylic acid-modified rosin may be, for example, maleic acid, anhydrous maleic acid, fumaric acid, acrylic acid, methacrylic acid and the like. The unsaturated carboxylic acid-modified rosin is modified by using generally from 1 part by mass to 30 parts by mass of unsaturated carboxylic acid based on 100 parts of the raw rosin.

Among the rosins, the preferred rosin in the present exemplary embodiment is the purified rosin, the disproportionate rosin and the hydrogenated rosin, and may be used either alone or in combination thereof.

Hereinafter, exemplary compounds of the rosin diol will be shown. However, exemplary compounds (1), (2), (18), (19) and (38) exemplify bisphenol A type rosin diols, exemplary compounds (3), (4), (20), (21) and (39) exemplify bisphenol F type rosin diols, and exemplary compounds (43) to (47) exemplify biphenyl type rosin diols.

In the following exemplary compounds, n represents an integer of 1 or greater.

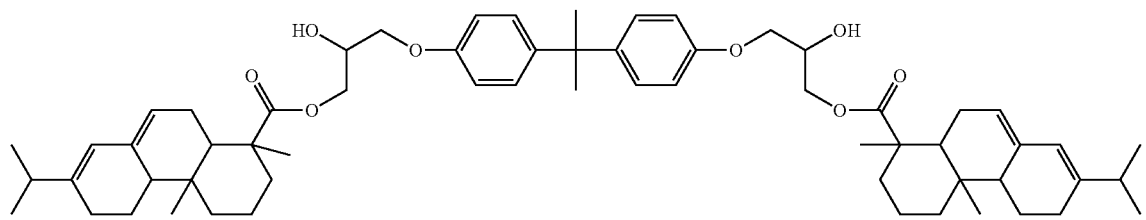

(1)

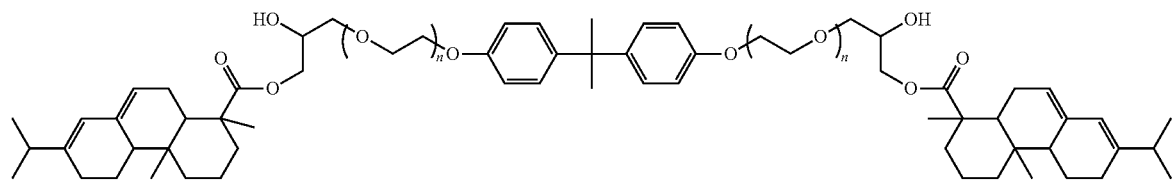

(2)

-continued
(3)
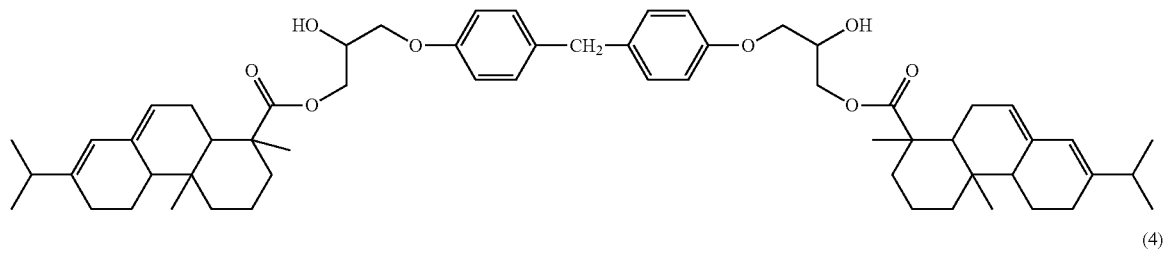
(4)
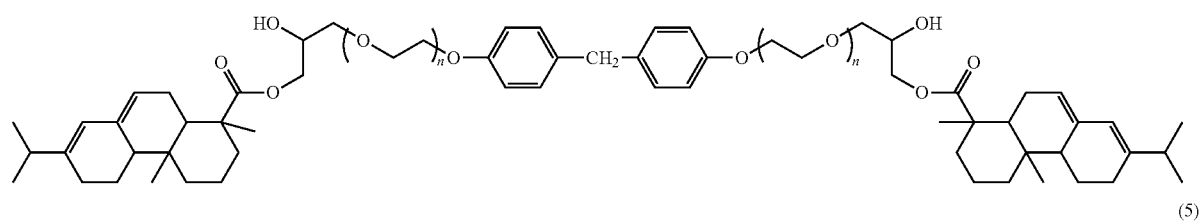
(5)
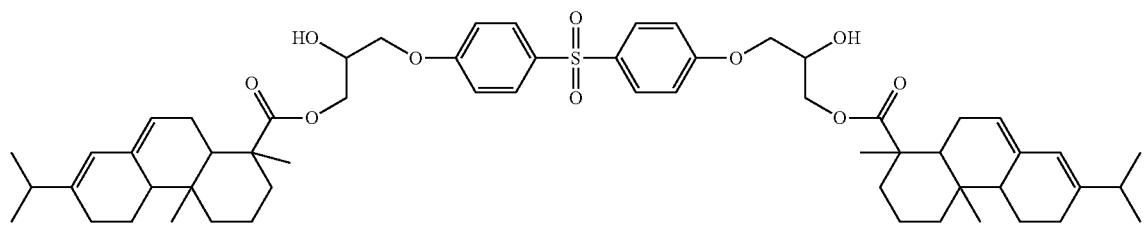
(6)
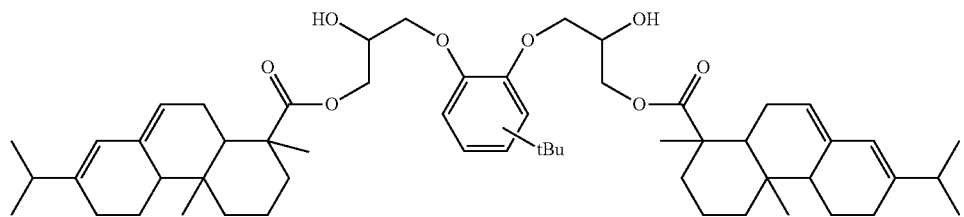
(7)
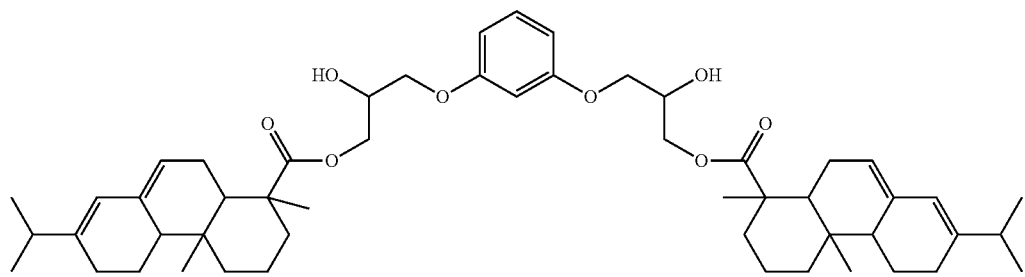
(8)
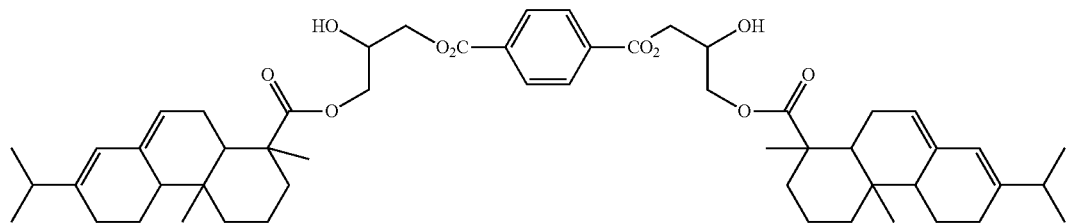

-continued
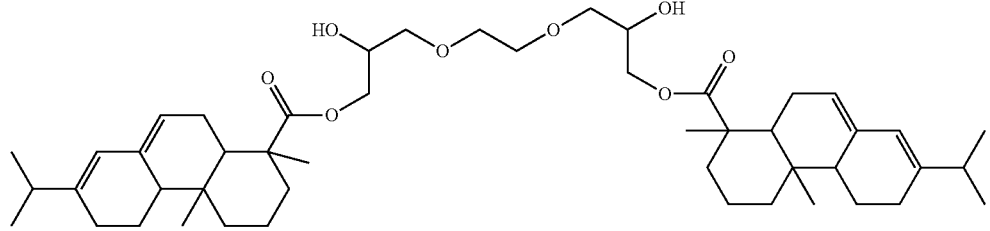
(9)
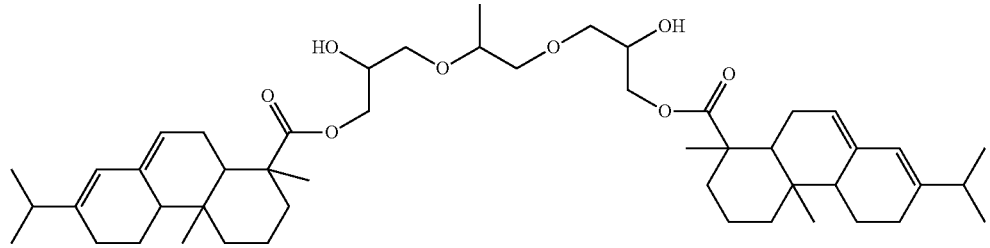
(10)
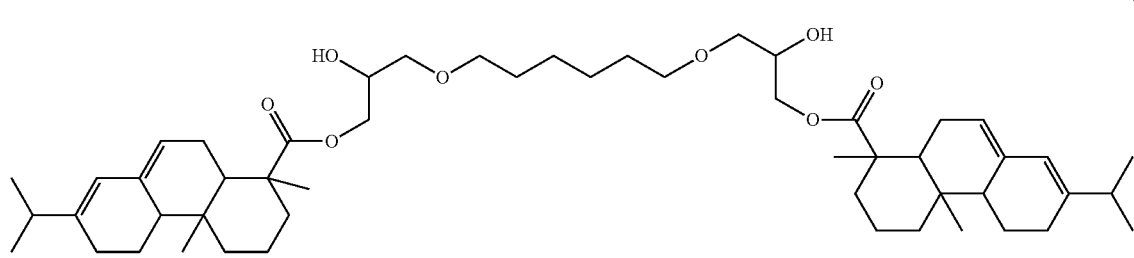
(12)
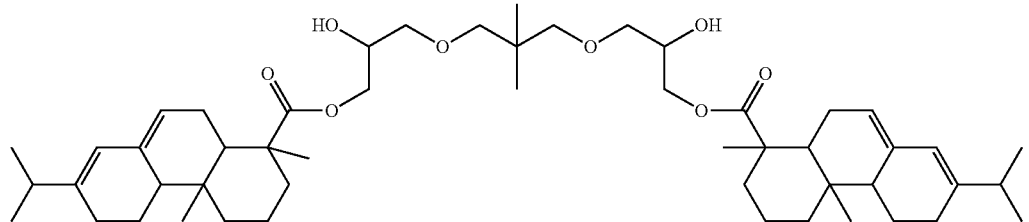
(13)
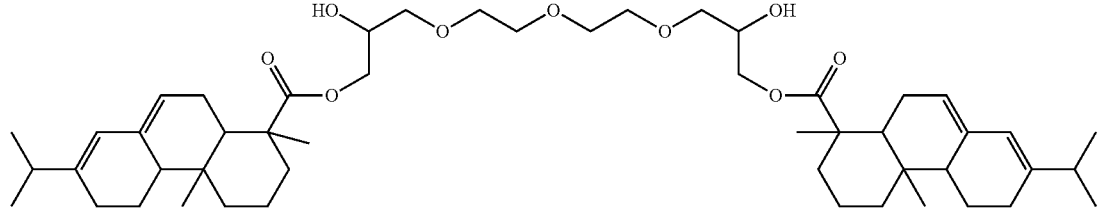
(14)
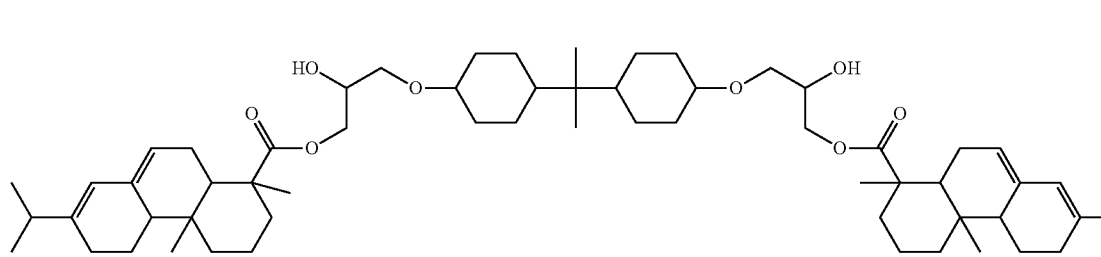
(15)

-continued
(16)
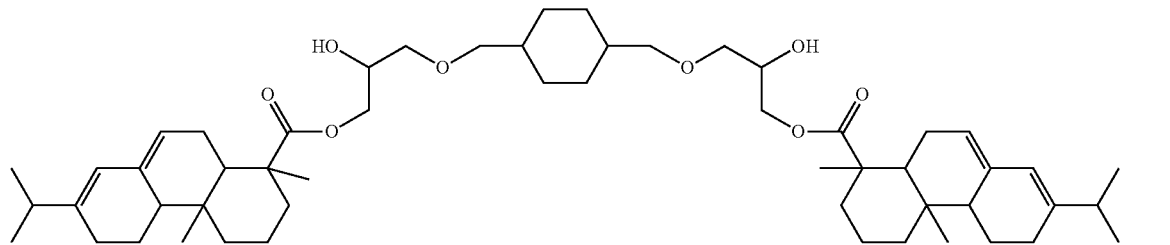
(17)
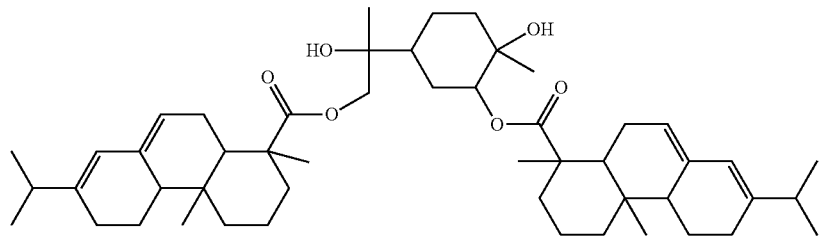
(18)
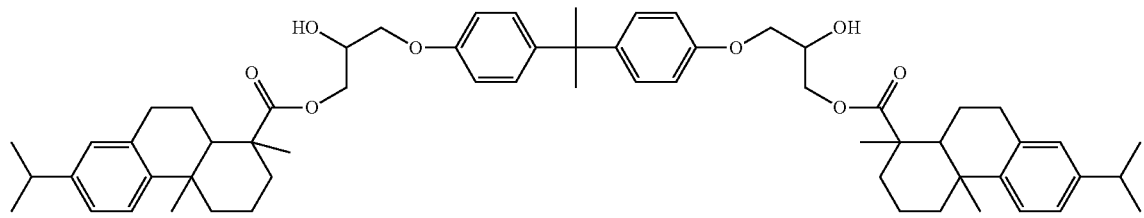
(19)
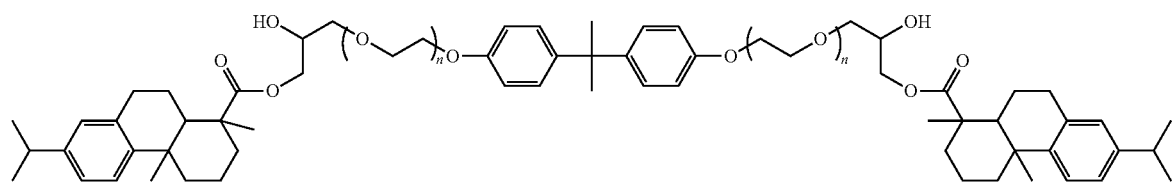
(20)
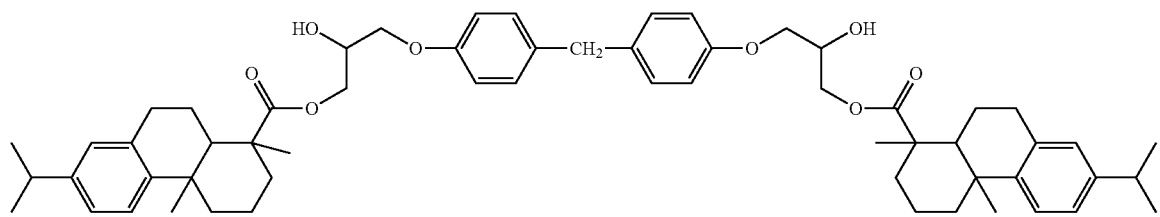
(21)
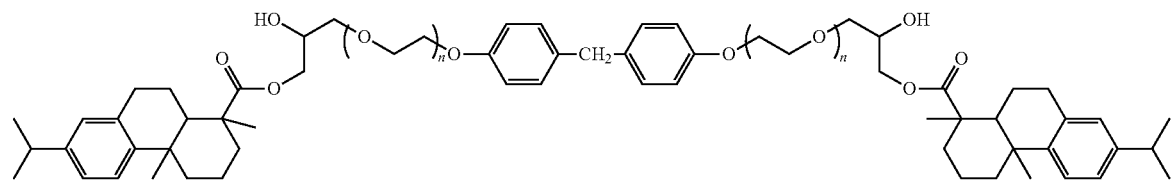

-continued
(22)
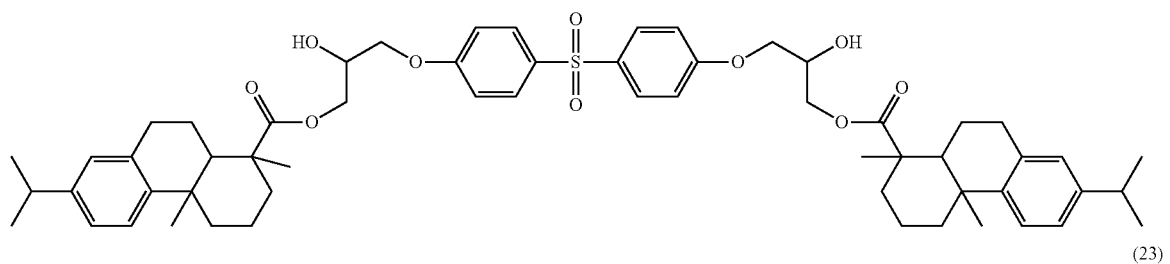
(23)
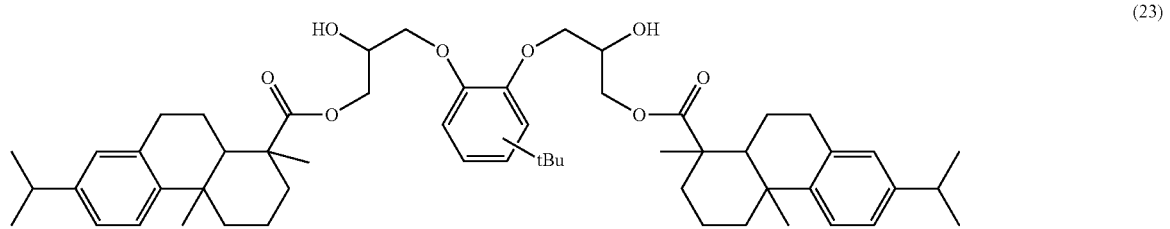
(24)
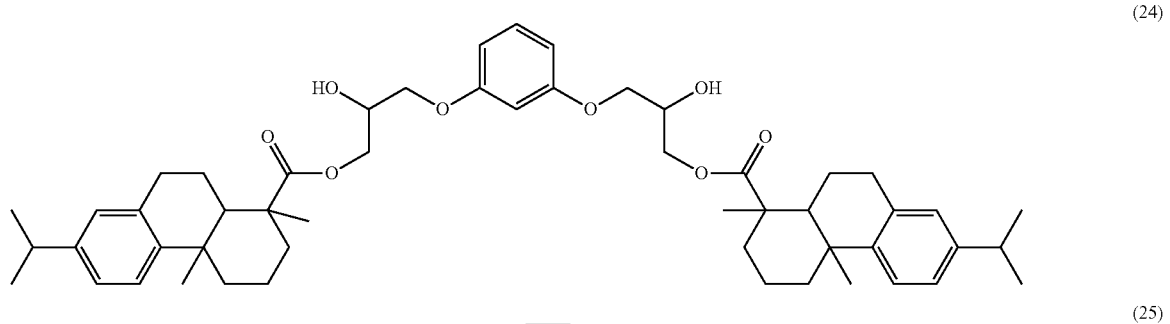
(25)
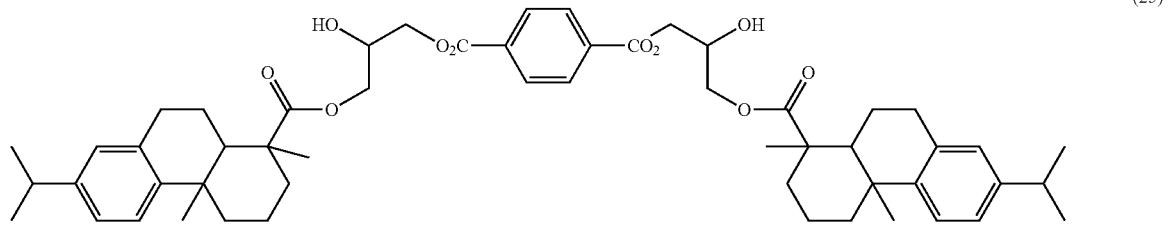
(26)
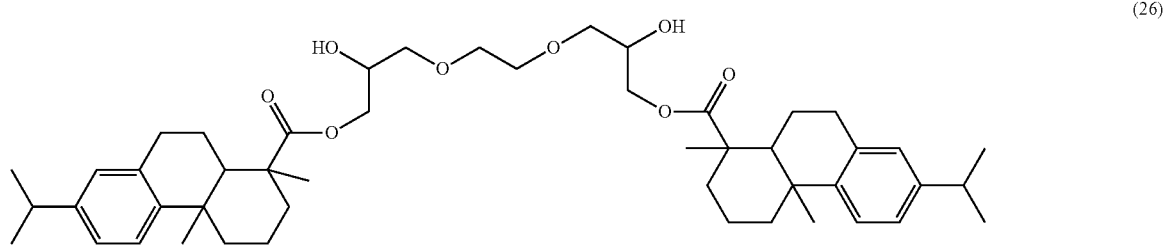
(27)

-continued
(28)
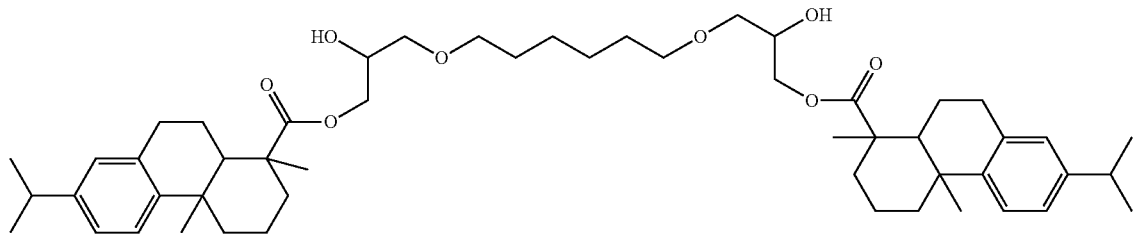
(29)
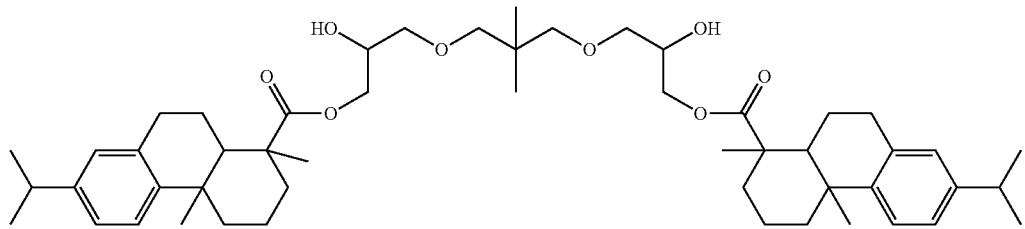
(30)
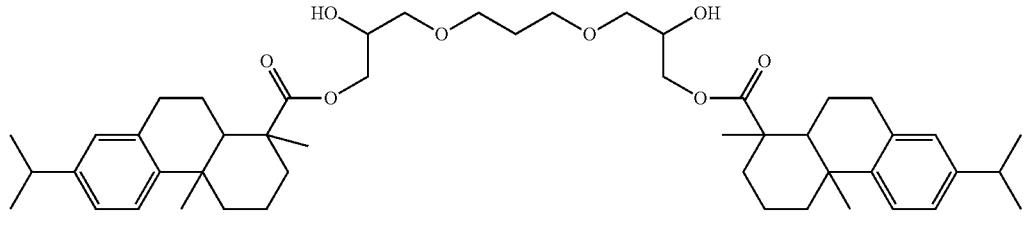
(31)
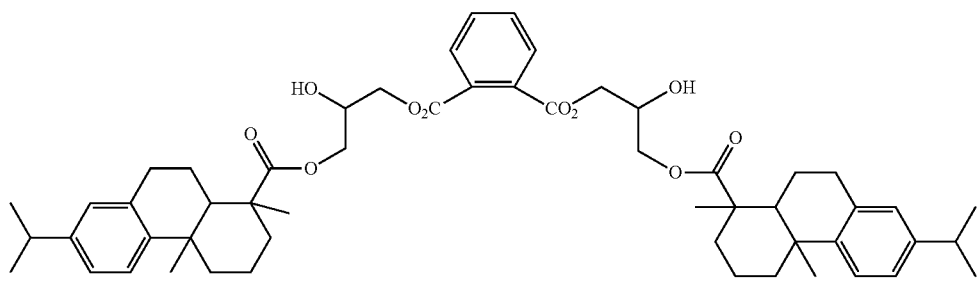
(32)
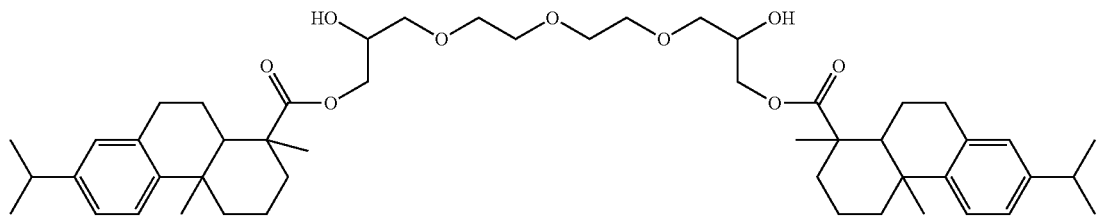
(33)
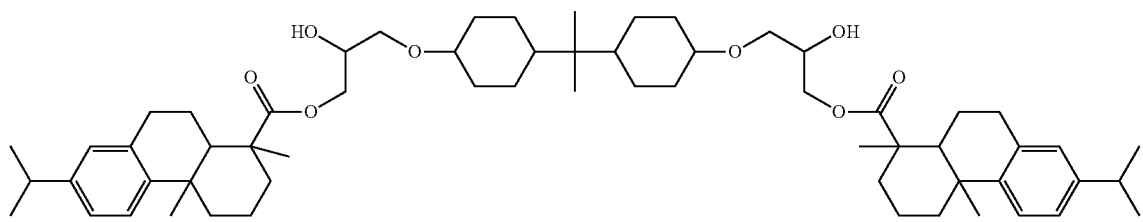

(34)
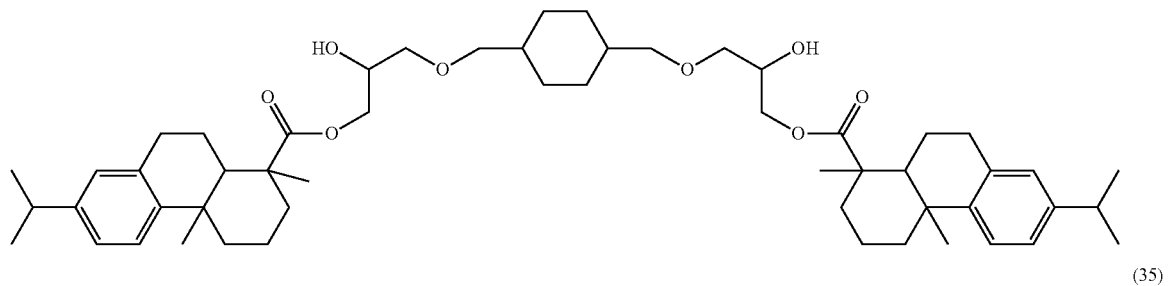
(35)
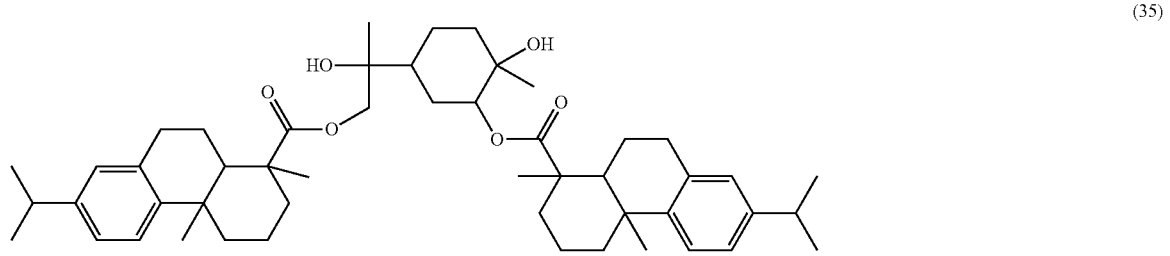
(36)
(37)
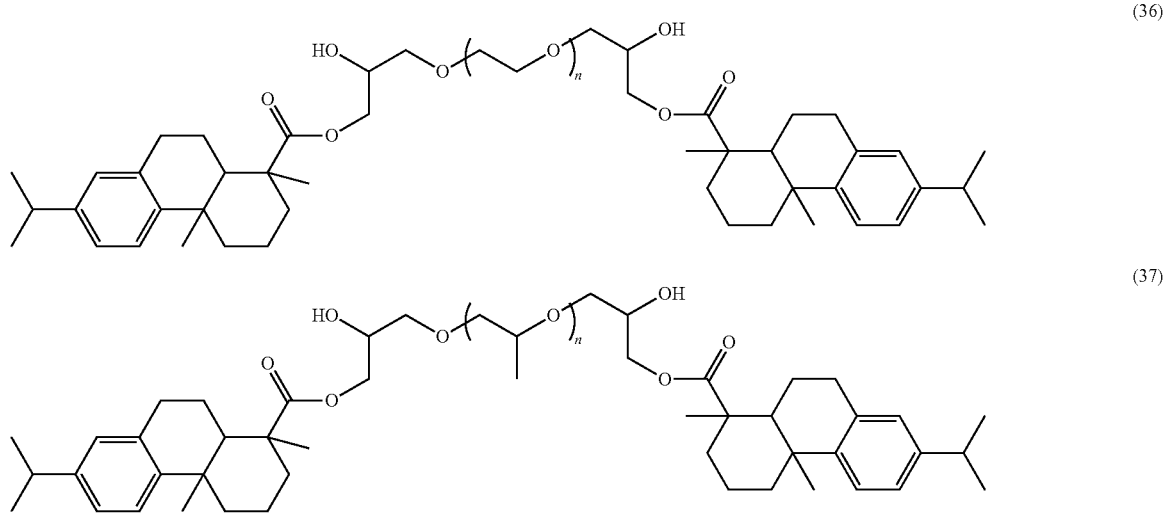
(38)
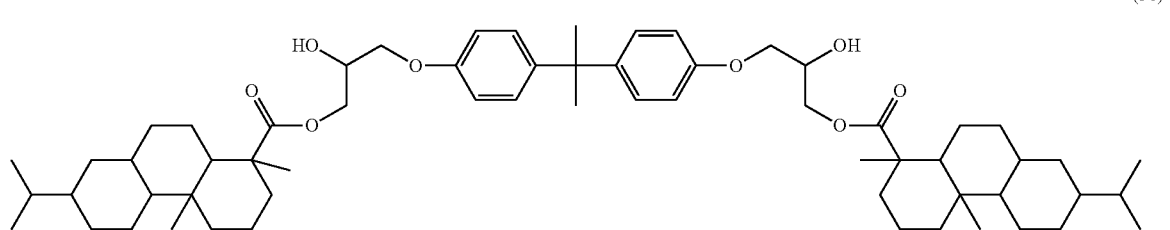
(39)
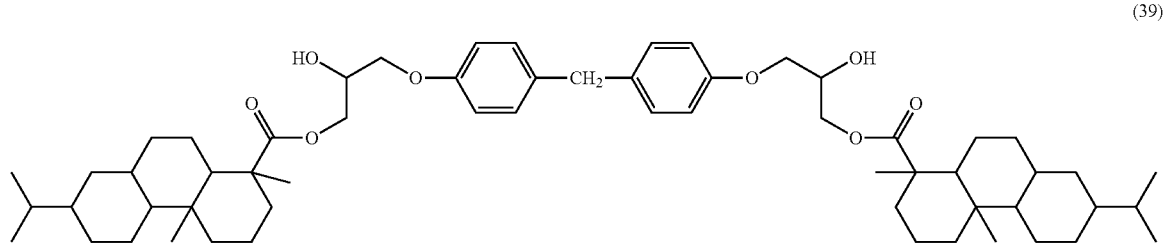

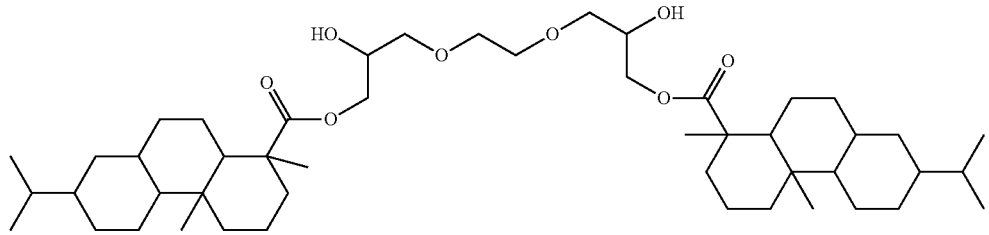
(40)
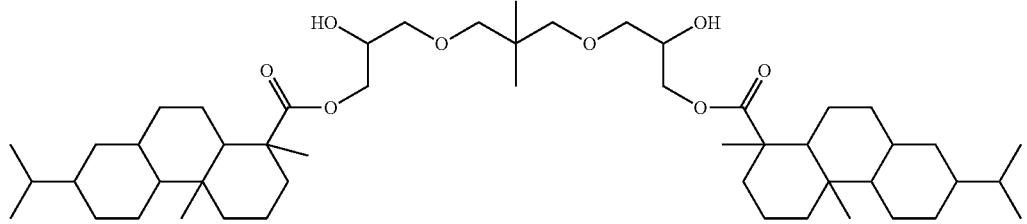
(41)
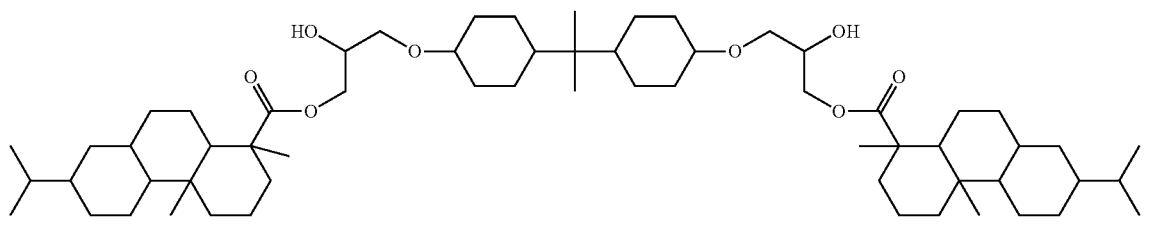
(42)
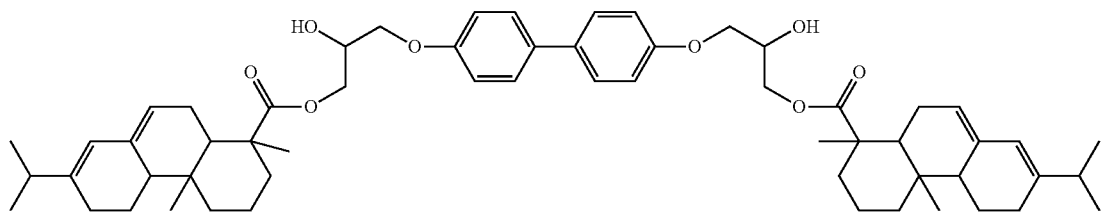
(43)
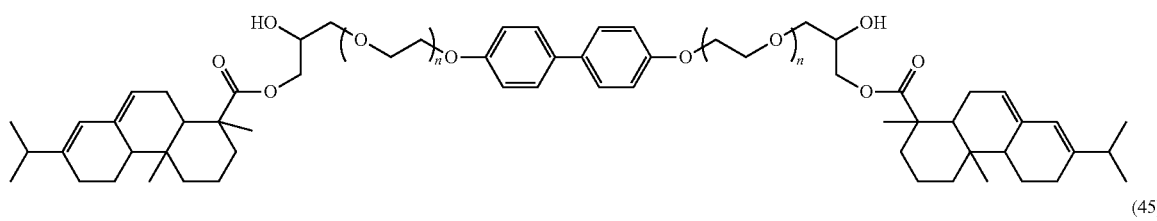
(44)
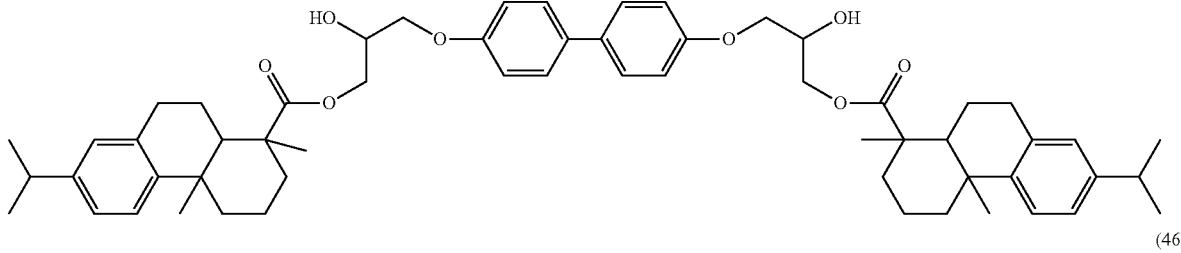
(45)
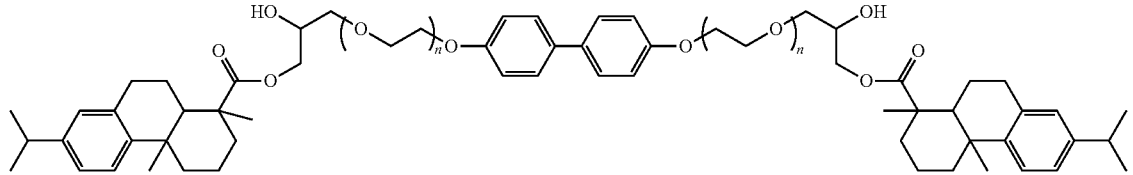
(46)

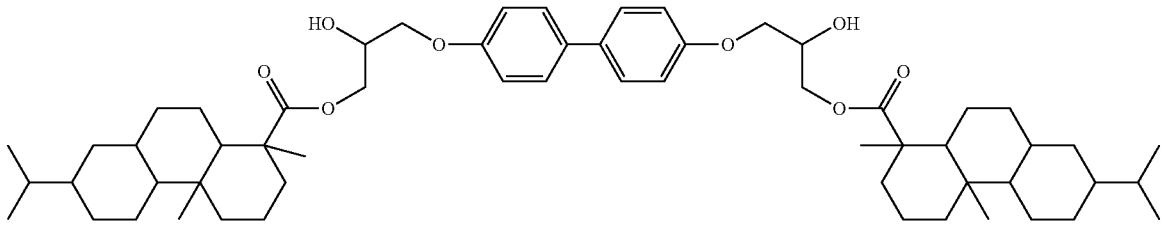

(47)

(Polyvalent Carboxylic Acid Components)

Examples of the polyvalent carboxylic acid component include dicarboxylic acid, and one or more selected from the group consisting of, for example, aromatic dicarboxylic acids and aliphatic dicarboxylic acids are used as the dicarboxylic acid component. Examples thereof include: aromatic dicarboxylic acids, such as phthalic acid, isophthalic acid, terephthalic acid, 1,4-naphthalenedicarboxylic acid, 2,6-naphthalenedicarboxylic acid and the like; aliphatic dicarboxylic acids, such as oxalic acid, malonic acid, maleic acid, fumaric acid, citraconic acid, itaconic acid, glutaconic acid, succinic acid, adipic acid, sebacic acid, azelaic acid, dimeric acids, branched $C_1$-$C_{20}$ alkyl succinic acids, branched alkenyl succinic acids having $C_1$-$C_{20}$ alkenyl groups and the like; anhydrides of these acids; and alkyl (having 1 to 3 carbon atoms) esters of these acids and the like. Of these, aromatic carboxylic acid compounds are preferred in terms of durability and fixability of a toner and dispersibility of a coloring agent.

Examples of the tri- or higher valent carboxylic acids include specific aromatic carboxylic acids, such as 1,2,3-benzenetricarboxylic acid, 1,2,4-benzenetricarboxylic acid, 1,2,4-naphthalenetricarboxylic acid and the like, and anhydrides thereof or lower alkyl esters thereof, and the like. These may be used either alone or in combination of two or more thereof.

As the acid component, dicarboxylic acid components having a sulfonic acid group may be included in addition to aliphatic dicarboxylic acids or aromatic dicarboxylic acids.

(Forming Method of Polyester Resin for Toner)

The polyester resin for a toner according to the present embodiment is prepared from the polyvalent carboxylic acid component and the polyhydric alcoholic component as raw materials by forming methods publicly known and used in the art. As the reaction method thereof, either transesterification or direct esterification may be applied. In addition, the polycondensation may also be accelerated by increasing the reaction temperature under pressure or flowing an inert gas under reduced pressure or ambient pressure. Depending on the reaction, a reaction catalyst publicly known and used in the art, such as one or more metal compounds selected from antimony, titanium, tin, zinc, aluminum and manganese may be used to accelerate the reaction. The reaction catalyst is preferably added in an amount of 0.01 parts by mass to 1.5 parts by mass and more preferably 0.05 parts by mass to 1.0 part by mass, based on 100 parts by mass of the polyvalent carboxylic acid and the polyhydric alcohol as a total amount. The reaction temperature may be, for example, from 180° C. to 300° C.

Hereinafter, an example of the reaction schemes of the bisphenol A type rosin diol and the polyvalent carboxylic acid component will be shown.

The portion surrounded by the dashed line in Formula representing the polyester resin corresponds to the rosin ester group according to the present embodiment.

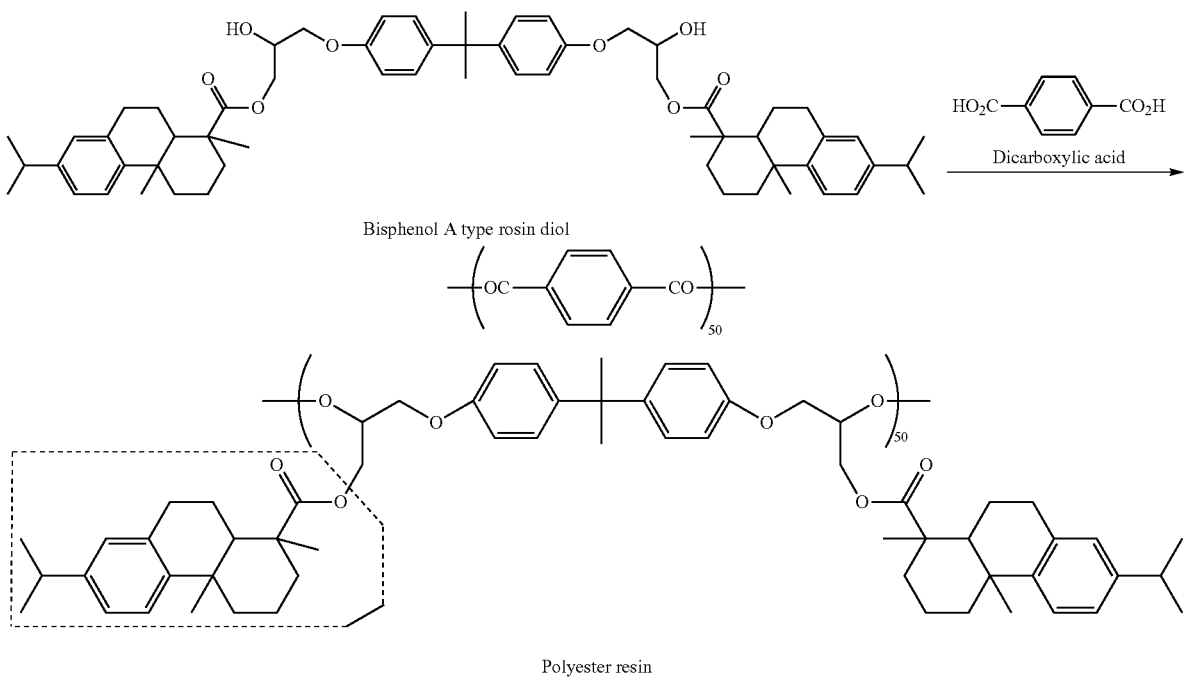

Bisphenol A type rosin diol

Dicarboxylic acid

Polyester resin

Hydrolysis of the polyester resin for a toner according to the present embodiment gives the following monomers. Since the polyester is a condensation product of a dicarboxylic acid and a diol in a ratio of 1:1, the constituent components of the resin are estimated from the hydrolysates.

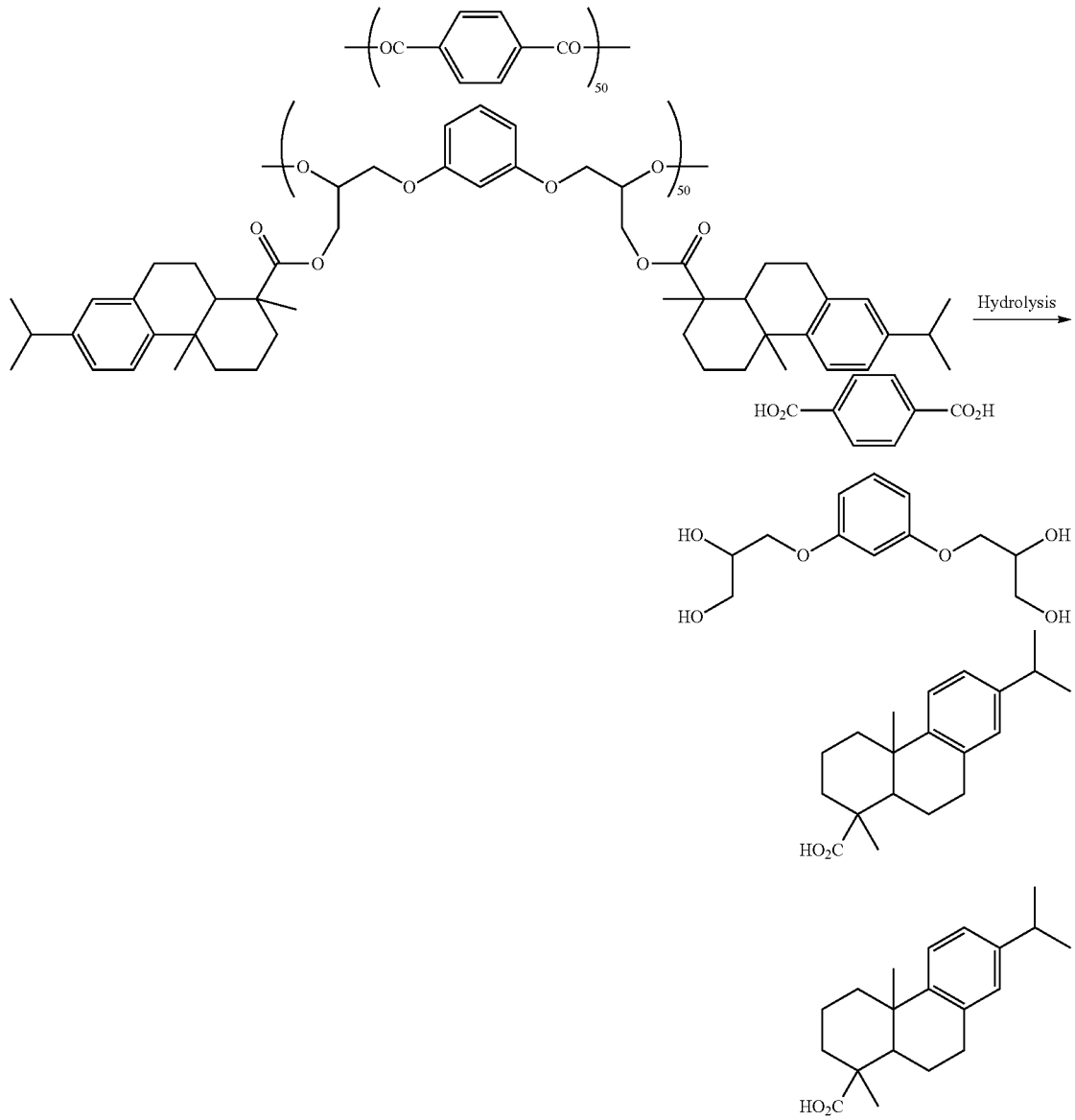

(Characteristics of Polyester Resin for Toner)

In terms of the durability and offset resistance of a toner, the weight average molecular weight of the polyester resin for a toner according to the present embodiment is preferably from 4,000 to 1,000,000 and more preferably from 7,000 to 300,000.

The weight average molecular weight of the polyester resin for a toner is measured by the following method.

Two lines of "HLC-8120GPC and SC-8020 (manufactured by TOSOH Corporation, 6.0 mm ID×15 cm)" are used and tetrahydrofuran (THF) is used as an eluting solvent. Measurements are performed by using an RI detector under the following conditions: sample concentration=0.5%, flow rate=0.6 ml/min, sample injection amount=10 μl, measuring temperature=40° C. Furthermore, standard calibration curves are plotted using 10 polystyrene standard (TSK standard) samples A-500, F-1, F-10, F-80, F-380, A-2500, F-4, F-40, F-128, and F-700, manufactured by TOSOH Corporation.

The softening temperature of the polyester resin for a toner according to the present embodiment is preferably from 80° C. to 160° C. and more preferably from 90° C. to 150° C. in terms of fixability, storability and durability of a toner.

The softening temperature is obtained as a temperature corresponding to a half of the height between the starting temperature and the end temperature of the outflow when a sample of 1 cm$^3$ is melted and is allowed to flow out using a flow tester CFT-500 (manufactured by Shimadzu Corporation) under the conditions of a dice pore diameter of 0.5 mm, a pressure load of 0.98 MPa (10 kg/cm$^2$) and a heating rate of 1° C./min.

The glass transition temperature of the polyester resin for a toner according to the present embodiment is preferably from 35° C. to 80° C. and more preferably from 40° C. to 70° C. in terms of the fixability, storability and durability. The softening temperature and glass transition temperature are easily adjusted by controlling the composition of the raw monomers, the kind of a polymerization initiator, the molecular weight of the polyester resin and the amount of the catalyst, or by selecting reaction conditions.

The glass transition temperature is measured by using "DSC-20" (manufactured by SEICO Electronics industrial Co., Ltd.) while heating 10 mg of a sample at a heating rate of (10° C./min).

In terms of the electrostatic properties of a toner, the acid value of the polyester resin for a toner of the present embodiment is from 3 mgKOH/g to 30 mgKOH/g, but preferably from 9 mgKOH/g to 21 mgKOH/g. When the acid value is higher than 30 mgKOH/g, the resin easily contains water and electrostatic properties are deteriorated particularly in summer environments, and when the acid value is lower than 3 mgKOH/g, there may be a case that the electrostatic properties are significantly deteriorated.

The polyester resin for a toner of the present embodiment contains a rosin ester group, but the rosin ester group possesses a bulky structure and is highly hydrophobic. Further, since the air-interface of a toner is generally hydrophobic, the rosin ester group is likely to be exposed on the surface of the toner of the present exemplary embodiment containing the polyester resin for a toner of the present embodiment. In particular, since the polyester resin for a toner according to the present exemplary embodiment contains a rosin ester group on the side chain rather than on the main chain, the rosin ester group has a high degree of freedom and is more likely to be exposed on the surface. However, if the amount of the rosin ester group exposed on the surface of the toner is too much, the electrostatic properties of the toner may be deteriorated in some cases. In the present exemplary embodiment, by setting the acid value of the polyester resin for a toner to 3 mgKOH/g to 30 mgKOH/g, the toner is adjusted so as to have a desirable amount of electric charge.

The acid value is measured by neutralization titration in accordance with JIS K0070. Specifically, 100 ml of a mixed solvent of diethyl ether and ethanol and drops of phenolphthalein as an indicator are added to an appropriate amount of a sample, and the resulting mixture is sufficiently stirred in a water bath until the sample is completely dissolved. The solution is titrated with a 0.1 mol/l ethanolic solution of potassium hydroxide. The time when pale red of the indicator is observed for 30 sec is defined as the endpoint. The acid value A is calculated by $A=(B \times f \times 5.611)/S$ where A is the acid value, S is the sample amount (g), B is the volume (ml) of the 0.1 mol/l ethanolic solution of potassium hydroxide used in the titration, and f is the factor of the 0.1 mol/l ethanolic solution of potassium hydroxide.

The polyester resin for a toner according to the present embodiment may be a modified polyester resin. Examples of the modified polyester resins include polyester resins that are grafted or blocked with phenol, urethane, epoxy, or the like by the methods described in Japanese Patent Application Laid-Open Nos. H11-133668, H10-239903, H8-20636 and the like.

[Toner for Developing Electrostatic Image]

The toner according to the present embodiment includes the polyester resin for a toner according to the present embodiment.

Hereinafter, detailed description of the toner according to the present embodiment will be described.

The toner according to the present embodiment has, for example, toner particles, and external additives, if necessary.

(Toner Particles)

The toner particles will be described.

The toner particles contain a binder resin, and if necessary, a coloring agent, a release agent and other additives.

Examples of the binder resin include an amorphous resin, and as the amorphous resin, the polyester resin for a toner according to the present embodiment is applied.

As the binder resin, a crystalline resin may be used in combination with the amorphous resin.

As the binder resin, amorphous resins other than the polyester resin for a toner according to the present embodiment may be used in combination with the polyester resin for a toner according to the present embodiment.

However, the content of the polyester for a toner according to the present embodiment is preferably 70 parts by mass or more and more preferably 90 parts by mass or more based on 100 parts by mass of the total binder resin.

Herein, the amorphous resin refers to a resin which does not have a clear endothermic peak but has only stepwise change in endothermic amount in a thermal analysis measurement using differential scanning calorimetry (DSC), is a solid at room temperature (for example, 25° C.), and is thermally plasticized at a temperature equal to or higher than the glass transition temperature.

Meanwhile, the crystalline resin refers to a resin which does not have stepwise change in endothermic amount but has a clear endothermic peak in differential scanning calorimetry (DSC).

Specifically, the crystalline resin means a case where a half width of the endothermic peak is within 10° C. when the resin is measured at a heating rate of, for example, 10° C./min, and the amorphous resin means a resin showing a half width exceeding 10° C., or a resin in which a clear endothermic peak is not confirmed.

Examples of the crystalline resin include a crystalline polyester resin, a polyalkylene resin, a long-chain alkyl(meth)acrylate resin and the like. The crystalline polyester resin is preferred from the viewpoint that the resin markedly expresses drastic viscosity change caused by heating and that the mechanical strength and low-temperature fixability become compatible.

As the crystalline polyester resin, a polycondensate of an aliphatic dicarboxylic acid (including an acid anhydride and an acid chloride thereof) and an aliphatic diol is suitable, for example, from the viewpoint of realizing low-temperature fixability.

The content of the crystalline resin is preferably from 1 part by mass to 20 parts by mass and more preferably from 5 parts by mass to 15 parts by mass, based on 100 parts by mass of the total binder resin.

The low-temperature fixing in the present embodiment refers to a case of fixing the toner by heating the toner at 120° C. or lower.

Examples of other amorphous resins include known binder resins, for example, other resins, such as a vinyl-based resin such as a styrene-acryl resin and the like, an epoxy resin, polycarbonate, polyurethane and the like.

-Coloring Agent-

The coloring agent may be, for example, a dye or a pigment, but a pigment is preferred in terms of light fastness and water fastness.

The coloring agent may be a pigment known in the art, such as, for example, carbon black, aniline black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, C.I. Pigment Blue 15:3 and the like.

If necessary, it is also effective to use a surface-treated coloring agent or a pigment dispersing agent as the coloring agent.

Depending on the choice of coloring agents, the toner of the present exemplary embodiment may be yellow, magenta, cyan or black in color.

The content of the coloring agent is preferably in the range of from 1 part by mass to 30 parts by mass, based on 100 parts by mass of the binder resin.

-Release Agent-

Examples of release agents include: paraffin waxes, such as low molecular weight polypropylenes, low molecular weight polyethylenes and the like; silicone resins; rosins; rice wax; carnauba wax; and the like. The melting temperatures of these release agents are preferably from 50° C. to 100° C. and more preferably from 60° C. to 95° C.

The content of the release agent is preferably from 0.5 part by mass to 15 parts by mass and more preferably from 1.0 part by mass to 12 parts by mass, based on 100 parts by mass of the binder resin.

The presence of the release agent in an amount of 0.5% by mass or more prevents the occurrence of peeling defects particularly in oilless fixing. The presence of the release agent in an amount of 15% by mass or less improves image quality and reliability for image formation without causing deterioration in the flowability of the toner.

-Other Additives-

As a charge controlling agent, any of those known in the art may be used, but azo-based metal complex compounds, metal complex compounds of salicylic acid and resin type charge controlling agents containing polar groups may also be used.

-Characteristics of Toner Particles-

Toner particles may be toner particles having a single layered structure or toner particles having a so-called core/shell structure composed of a core portion (core particles) and a coated layer (shell layer) coating the core portion.

The toner particles having a core/shell structure may be composed of, for example, a binder resin (the polyester resin and the crystalline polyester resin according to the present embodiment), a core portion including other additives such as a coloring agent, a release agent and the like, if necessary, and a coated layer including a binder resin (the polyester resin according to the present embodiment).

The volume average particle diameter of the toner particles is, for example, from 2.0 μm to 10 μm and preferably from 3.5 μm to 7.0 μm.

In addition, as a method for measuring the volume average particle diameter of the toner particles, 0.5 mg to 50 mg of a sample is added into a surfactant as a dispersing agent, preferably 2 ml of a 5% by mass aqueous solution of sodium alkylbenzene sulfonate. The mixture is then added into 100 ml to 150 ml of the electrolyte solution. The electrolyte solution in which the sample is suspended is subjected to a dispersion treatment using an ultrasonic disperser for 1 minute, and a particle size distribution of particles having a particle diameter in the range of from 2.0 μm to 60 μm is measured using the coulter multisizer II type (manufactured by Beckmann Coulter, Inc.) with an aperture diameter of 100 p.m. The number of particles to be measured is defined as 50,000.

A cumulative distribution of the volume is subtracted from the small particle diameter side with respect to the particle size range (channel) divided on the basis of obtained particle size distribution, and the particle diameter at 50% accumulation is defined as a volume average particle diameter D50v.

The shape coefficient SF1 of the toner particles is suitably, for example, from 110 to 150 and preferably from 120 to 140.

Herein, the shape coefficient SF1 is obtained by the following Equation (1).

$$SF1=(ML^2/A)\times(\pi/4)\times100 \qquad \text{Equation (I)}$$

In Equation (I), ML and A represent the absolute maximum length of the toner and the projection area of the toner, respectively.

The SF1 is usually digitized by the analysis of a microscopic image or a scanning electron microscopic (SEM) image using an image analyzer, and is calculated, for example in the following mariner. That is, an optical microscopic image of particles scattered on the surface of a slide glass is included in a Luzex image analyzer through a video camera, the maximum length and projection area of 100 particles are determined, and the average thereof is determined by the Equation (1) to obtain SF1.

(External Additives)

Examples of external additives include inorganic particles, and examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, $MgSO_4$ and the like.

The surface of the inorganic particle as the external additive may be subjected to a hydrophobization treatment in advance. The hydrophobization treatment is carried out by, for example, immersing the inorganic particles in a hydrophobization treating agent and the like. The hydrophobization treating agent is not particularly limited, but examples thereof include a silane-based coupling agent, a silicone oil, a titanate-based coupling agent, an aluminum-based coupling agent and the like. These may be used either alone or in combination of two or more thereof.

The amount of the hydrophobization treating agent is usually, for example, about from 1 part by mass to 10 parts by mass based on 100 parts by mass of the inorganic particles.

Examples of external additives also include resin particles (resin particles such as polystyrene, PMMA, melamine resins and the like), cleaning activators (for example, a metal salt of higher fatty acid represented by zinc stearate and a particle powder of a fluorine-based polymer having a high molecular weight) and the like.

The externally added amount of the external additive is, for example, suitably from 0.01 part by mass to 5 parts by mass and preferably from 0.01 part by mass to about 2.0 parts by mass based on 100 parts by mass of the toner particles.

(Preparation Method of Toner)

Hereinafter, a preparation method of the toner according to the present embodiment will be described.

Toner particles may be prepared by any of a dry method (for example, kneading-pulverization method and the like) and a wet method (for example, an aggregation-coalescence method, a suspension polymerization method, a dissolution-suspension granulation method, a dissolution-suspension method, a dissolution-emulsification aggregation-coalescence method and the like), Among them, however, toner particles may be obtained by, for example: a kneading-pulverization method in which a binder resin, and if necessary, a coloring agent, a release agent, other internal additives and the like are added, followed by kneading, grinding and classifying the mixture; and a method for changing the shape of particles obtained by the kneading-pulverization method through mechanical impact force or heat energy.

Thus, the toner according to the present embodiment is prepared by, for example, adding an external additive to toner particles obtained in a dried state and mixing the mixture. The mixing may be carried out, for example, by a V-type blender, a Henschel mixer, a Roedige mixer, or the like. Furthermore, if necessary, coarse particles of the toner may be removed by using a vibrating screening machine, an air screening machine or the like.

[Electrostatic Image Developer]

The electrostatic image developer according to the present embodiment includes at least the toner according to the present embodiment.

The electrostatic image developer according to the present embodiment may be a single component developer including only the toner according to the present embodiment and a two-component developer in which the toner and a carrier are mixed.

There is no particular restriction on the kind of carrier, and the carrier may be any of those known in the art. Examples of the carrier include a resin-coated carrier, a magnetic dispersion carrier, a resin dispersion carrier and the like.

The mixing ratio (mass ratio) of the toner according to the present embodiment to the carrier in the two-component developer is preferably in the range of toner:carrier=about 1:100 to about 30:100 and more preferably about 3:100 to about 20:100.

[Image Forming Apparatus/Image Forming Method]

Subsequently, explanation will be given concerning an image forming apparatus/an image forming method according to the present embodiment.

The image forming apparatus according to the present exemplary embodiment includes an image holding member, a charging unit configured to electrically charge the surface of the image holding member, a electrostatic image forming unit configured to form an electrostatic image on the surface of the image holding member, a developing unit configured to accommodate an electrostatic image developer and develop the electrostatic image with the electrostatic image developer to form a toner image, a transferring unit configured to transfer the toner image to a recording medium, and a fixing unit configured to fix the toner image on the recording medium. Thus, as the electrostatic image developer, the electrostatic image developer according to the present embodiment is applied.

In the image forming apparatus according to the present embodiment, a part including the developing unit may be, for example, a cartridge structure (process cartridge) that is detachably attached to the image forming apparatus, and as the process cartridge, for example, a process cartridge accommodating the electrostatic image developer according to the present embodiment to include a developing unit is appropriately used.

The image forming method according to the present embodiment includes a charging process of electrically charging the surface of the image holding member, an electrostatic image forming process of forming an electrostatic image on the surface of the image holding member, a developing process of developing the electrostatic image with an electrostatic image developer to form a toner image, a transferring process of transferring the toner image to a recording medium and a fixing process of fixing the toner image on the recording medium. Thus, as the electrostatic image developer, the electrostatic image developer according to the present embodiment is applied.

Hereinafter, an example of the image forming apparatus according to the present embodiment will be illustrated, but the present embodiment is not limited thereto. Further, the main units of the image forming apparatus illustrated in the drawings will be described, and explanations of the other units are omitted.

FIG. 1 is a schematic view illustrating the constitution of a quadruple tandem type color image forming apparatus. The image forming apparatus illustrated in FIG. 1 includes first, second, third and fourth image forming units 10Y, 10M, 10C and 10K (image forming units) of electrophotographic mode outputting color images in yellow (Y), magenta (M), cyan (C) and black (K), respectively, based on color-separated image data. The image forming units (hereinafter, simply referred to as "units" in some cases) 10Y, 10M, 10C and 10K are arranged in parallel to one another at predetermined intervals in a horizontal direction. In addition, the units 10Y, 10M, 10C and 10K may be process cartridges that can be detachably attached to a main body of the image forming apparatus.

An intermediate transfer belt 20 as an intermediate transfer member is installed through each unit to run on top of the units 10Y, 10M, 10C and 10K in the drawing. The intermediate transfer belt 20 is installed to wind a drive roller 22 and a support roller 24 in contact with the inner side of the intermediate transfer belt 20, which are disposed apart from each other in a direction from the left side to the right side in the drawing, and runs in a direction from the first unit 10Y toward the fourth unit 10K. Furthermore, the support roller 24 is pressed in a direction away from the drive roller 22 by a spring or the like which is not illustrated, and a tension is given on the intermediate transfer belt 20 winding the two rollers. In addition, at a lateral surface of an image holding member of the intermediate transfer belt 20, an apparatus 30 for cleaning the intermediate transfer material is provided opposite the drive roller 22.

Developing apparatuses (developing units) 4Y, 4M, 4C and 4K of the units 10Y, 10M, 10C and 10K supply toners of four colors of yellow, magenta, cyan and black accommodated in the toner cartridges 8Y, 8M, 8C and 8K, respectively.

Since the aforementioned first to fourth units 10Y, 10M, 10C and 10K have the same constitution, herein, the first unit 10Y forming the yellow image, which is disposed upstream the running direction of the intermediate transfer belt, will be described as a representative. Further, parts corresponding to the first unit 10Y are designated by reference symbols M (magenta), C (cyan) and K (black) instead of Y (yellow), respectively, and the description of the second to fourth units 10M, 10C and 10K is omitted.

The first unit 10Y has a photoconductor 1Y acting as an image holding member. A charging roller 2Y for electrically charging the surface of the photoconductor 1Y with a predetermined potential, an exposure apparatus (unit for forming an electrostatic image) 3 for exposing the electrically charged surface to a laser beam 3Y based on color-separated image signals to form an electrostatic image, a developing apparatus (developing unit) 4Y for supplying an electrically charged toner to the electrostatic image to develop the electrostatic image, a primary transfer roller (a primary transfer unit) 5Y for transferring the developed toner image to the intermediate transfer belt 20, and a photoconductor cleaning apparatus (a cleaning unit) 6Y for removing the toner remaining on the surface of the photoconductor 1Y after the primary transfer are disposed in sequence around the photoconductor 1Y.

The primary transfer roller 5Y is disposed at the inner side of the intermediate transfer belt 20 and is installed in a position opposite the photoconductor 1Y. Furthermore, a bias power supply (not illustrated) for applying a primary transfer bias is connected to each of the primary transfer rollers 5Y, 5M, 5C and 5K. The transfer bias applied to each of the primary transfer rollers from the bias power supply is varied by a control unit (not illustrated).

Hereinafter, an explanation will be given concerning the formation operation of a yellow image in the first unit 10Y. Prior to the operation, the surface of the photoconductor 1Y is electrically charged to about −600 V to about −800 V by the roller 2Y.

The photoconductor 1Y is formed by laminating a photosensitive layer on a conductive base having a volume resistivity of $1 \times 10^{-6}$ Ωcm or less at 20° C. Although the resistance of the photosensitive layer is usually high (comparable to that of general resins), the resistivity of a portion of the photosensitive layer irradiated with the laser beam 3Y tends to vary. Depending on yellow image data sent from a control unit (not shown), the exposure apparatus 3 outputs the laser beam 3Y to the surface of the electrically charged photoconductor 1Y. The laser beam 3Y is irradiated onto the surface of the photoconductor 1Y to form an electrostatic latent image in a yellow factor pattern on the surface of the photoconductor 1Y.

The electrostatic latent image refers to an image formed on the surface of the photoconductor 1Y by electrostatic charging. The electrostatic latent image is formed in the form of a so-called negative latent image because electrical charges flow on the surface of irradiated portions of the photoconductor 1Y due to the decreased resistivity of the irradiated portions but electrical charges remain on portions non-irradiated with the laser beam 3Y.

The electrostatic latent image formed on the photoconductor 1Y is rotated up to a predetermined development position according to the running motion of the photoconductor 1Y. At the development position, the electrostatic latent image on the photoconductor 1Y is visualized (developed) by the developing apparatus 4Y.

The electrostatic image developer according to the present embodiment including, for example, at least a yellow toner and a carrier is accommodated in the developing apparatus 4Y. The yellow toner is friction-charged while agitating inside the developing apparatus 4Y, possesses the same polarity (negative polarity) as the counter charges charged on the photoconductor 1Y, and is maintained on a developer roll (a developer holding member). As the surface of the photoconductor 1Y passes through the developing apparatus 4Y, the yellow toner is electrostatically attached to the antistatic latent image portions on the surface of the photoconductor 1Y, and the latent image is developed with the yellow toner. The photoconductor 1Y, on which the yellow toner image is formed, runs continuously at a predetermined speed to allow the toner image developed on the photoconductor 1Y to be conveyed to a predetermined primary transfer position.

When the yellow toner image on the photoconductor 1Y is conveyed to the primary transfer, a primary transfer bias is applied to the primary transfer roller 5Y to allow an electrostatic force directing toward the primary transfer roller 5Y from the photoconductor 1Y to act on the toner image, and as a result, the toner image on the photoconductor 1Y is transferred to the intermediate transfer belt 20. In this case, the applied transfer bias has a polarity (+) opposite to the polarity (−) of the toner, and in the first unit 10Y, for example, the applied transfer bias is controlled to about +10 μA by a control unit (not illustrated).

Meanwhile, the toner remaining on the photoconductor 1Y is removed by the cleaning apparatus 6Y and is then collected.

The primary transfer biases applied to the primary transfer rollers 5M, 5C and 5K after the second unit 10M are also controlled in substantially the same manner as in the first unit.

In this manner, the intermediate transfer belt 20, to which the yellow toner image is transferred, is sequentially conveyed from the first unit 10Y to the second, third and fourth units 10M, 10C and 10K, and toner images of different colors overlap to be multi-transferred.

The intermediate transfer belt 20, where the four-colored toner images are multi-transferred while passing through the first to fourth units, reaches a secondary transfer unit including the intermediate transfer belt 20, the support roller 24 in contact with the inner side of the intermediate transfer belt 20 and a secondary transfer roller (a secondary transfer unit) 26 disposed on the side of an image holding surface of the intermediate transfer belt 20. Meanwhile, a recording paper (transfer-receiving material) P is fed at a predetermined timing into a gap between the secondary transfer roller 26 and the intermediate transfer belt 20, which are in contact with each other under pressure, through a feed mechanism, and a secondary transfer bias is applied to the support roller 24. In this case, the applied transfer bias has the same polarity (−) as the polarity (−) of the toner, and an electrostatic force directing toward the recording paper P from the intermediate transfer belt 20 acts on the toner image to allow the toner image on the intermediate transfer belt 20 to be transferred to the recording paper P. In addition, the secondary transfer bias at this time is determined depending on the resistance, which is detected by a resistance detecting unit (not illustrated) which detects the resistance of the secondary transfer unit, and the voltage thereof is controlled.

Thereafter, the recording paper P is fed to a pressure contact portion (nip portion) of a pair of fixing rolls in a fixing apparatus (a roll-type fixing unit) 28, and the toner image is fixed on the recording paper P and a fixed image is formed.

Examples of the transfer-receiving material for transferring the toner image include plain paper used for an electrophotographic photocopier, a printer and the like, OHP sheet and the like.

In order to further improve the smoothness of the surface of the image after the fixing, it is preferred that the surface of the transfer-receiving material is also smooth, and for example, coated paper obtained by coating the surface of plain paper with a resin or the like, art paper for printing and the like are appropriately used.

The recording paper P on which the color image is fixed is conveyed to the discharging unit, thereby completing the series of color image forming operations.

The exemplified image forming apparatus is constructed such that the toner image is transferred to the recording paper P through the intermediate transfer belt 20, but is not limited to this construction, and the image forming apparatus may have a construction that allows for direct transfer of the toner image from the photoconductor to the recording paper.

[Process Cartridge and Toner Cartridge]

Figure 2:
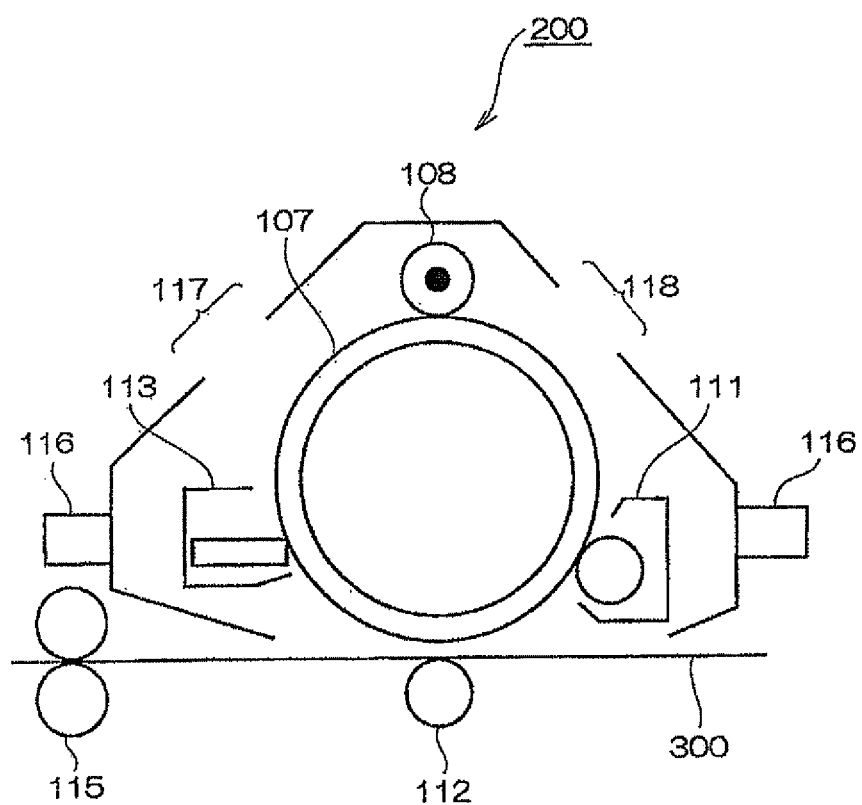
FIG. 2 is a schematic view illustrating the constitution of an example of a process cartridge according to the present embodiment.

FIG. 2 is a schematic view illustrating the constitution of an embodiment of a suitable example of a process cartridge accommodating the electrostatic image developer according to the present embodiment. The process cartridge 200 is a combination of a photoconductor 107, an electrically charging roller 108, a developing apparatus 111, a photoconductor cleaning apparatus 113, an opening for exposure 118 and an opening for antistatic exposure 117 by using an attachment rail 116, which are integrated into one cartridge. Further, reference numeral 300 in FIG. 2 indicates transfer-receiving material.

The process cartridge 200 is attached detachably to an image forming apparatus including a transfer apparatus 112, a fixing apparatus 115 and other elements (not illustrated).

The electrically charging apparatus 108, the developing apparatus 111, the cleaning apparatus 113, the opening for exposure 118 and the opening for antistatic exposure 117 are included in the process cartridge 200 illustrated in FIG. 2, but these apparatuses may be selectively combined. The process cartridge of the present embodiment includes one or more selected from the group consisting of the electrically charging apparatus 108, the developing apparatus 111, the cleaning apparatus (cleaning unit) 113, the opening for exposure 118 and the opening for antistatic exposure 117, except for the photoconductor 107.

Next, the toner cartridge according to the present embodiment will be described. The toner cartridge according to the present embodiment is a toner cartridge that is attached detachably to the image forming apparatus and at least accommodates an electrostatic image developing toner for supplying is fed into the developing unit installed in the image forming apparatus.

The image forming apparatus illustrated in FIG. 1 is an image forming apparatus that is constructed such that the toner cartridges 8Y, 8M, 8C and 8K are attached detachably, and the developing apparatuses 4Y, 4M, 4C and 4K are connected to toner cartridges corresponding to each developing apparatus (color) and toner feeding tubes (not illustrated). In addition, the toner cartridges are replaced with new ones when the amount of the toner accommodated in the toner cartridges is decreased.

EXAMPLES

Hereinafter, the present embodiment will be described in detail with reference to examples, but the present embodiment is not limited to the examples shown hereinbelow. In addition, "parts" and "%" in the examples mean "parts by mass" and "% by mass" unless otherwise indicated.

(Preparation of Polyhydric Alcoholic Component)
-Bisphenol A Type Rosin Diol 1-
113 parts of bisphenol A diglycidyl ether (trade name of jER828, manufactured by Mitsubishi Chemical Corporation and Mw 340.41) as a difunctional epoxy compound, 200 parts of gum rosin (Mw 302.45) as a rosin component, which is subjected to purification treatment by distillation (distillation conditions: 6.6 kPa and 220° C.), and 0.4 parts of tetraethylammonium bromide (manufactured by Tokyo Chemical Industry Co., Ltd.) as a reaction catalyst are put into a stainless steel reaction vessel equipped with a stirrer, a heater, a condenser and a thermometer, and the temperature is increased to 130° C. to perform a ring-opening reaction of the acid group of the rosin with the epoxy group of the epoxy compound. The reaction is continuously performed at the same temperature for 4 hours, and the reaction is stopped at a time point when the acid value reaches 0.5 mgKOH/g, yielding the bisphenol A type rosin diol 1.

Furthermore, the bisphenol A type rosin diol 1 corresponds to the exemplified compound 1.

-Biphenyl Type Rosin Diol 1-
49 parts of a biphenyl type epoxy (trade name of YL6121H, manufactured by Mitsubishi Chemical Corporation) as a difunctional epoxy compound, 87 parts of disproportionated rosin (trade name of KR-614, manufactured by Arakawa Chemical Industries Ltd.), and 0.4 parts of tetraethylammonium bromide (manufactured by Tokyo Chemical Industry Co., Ltd.) as a reaction catalyst are put into a stainless steel reaction vessel equipped with a stirrer, a heater, a condenser and a thermometer, and the temperature is increased to 130° C. to perform a ring-opening reaction of the acid group of the rosin with the epoxy group of the epoxy compound. The reaction is continuously performed at the same temperature for 4 hours, and the reaction is stopped at a time when the acid value reaches 0.5 mgKOH/g, yielding the biphenyl type rosin diol 1.

-Bisphenol F Type Rosin Dial 1-
49 parts of a bisphenol F type (trade name of jER806, manufactured by Mitsubishi Chemical Corporation) as a difunctional epoxy compound, 89 parts of disproportionated rosin, and 0.4 parts of tetraethylammonium bromide (manufactured by Tokyo Chemical Industry Co., Ltd.) as a reaction catalyst are put into a stainless steel reaction vessel equipped with a stirrer, a heater, a condenser and a thermometer, and the temperature is increased to 130° C. to perform a ring-opening reaction of the acid group of the rosin with the epoxy group of the epoxy compound. The reaction is continuously performed at the same temperature for 4 hours, and the reaction is stopped at a time point when the acid value reaches 0.5 mgKOH/g, yielding the bisphenol F type rosin diol 1.

-Comparative Rosin Diol 1-
50 parts of 1,4-bis(glycidyloxy)benzene (trade name of B20628, manufactured by Wako Pure Chemical Industries, Ltd.) as a difunctional epoxy compound, 87 parts of disproportionated rosin (trade name of KR-614, manufactured by Arakawa Chemical Industries Ltd.), and 0.4 parts of tetraethylammonium bromide (manufactured by Tokyo Chemical Industry Co., Ltd.) as a reaction catalyst are put into a stainless steel reaction vessel equipped with a stirrer, a heater, a condenser and a thermometer, and the temperature is increased to 130° C. to perforin a ring-opening reaction of the acid group of the rosin with the epoxy group of the epoxy compound. The reaction is continuously performed at the same temperature for 4 hours, and the reaction is stopped at a time when the acid value reaches 0.5 mgKOH/g, yielding the comparative rosin diol 1.

Further, the comparative rosin diol 1 corresponds to the exemplified compound 7.

(Synthesis of Polyester Resin)
-Polyester Resin A-
50 parts of the bisphenol A type rosin diol 1 as a polyhydric alcoholic component, 10 parts of terephthalic acid (manufactured by Wako Pure Chemical Industries, Ltd.), 30 parts of dodecenylsuccinic acid (manufactured Tokyo Chemical Industry Co., Ltd.) and 10 parts of sebacic acid (manufactured by Wako Pure Chemical Industries, Ltd.) as acid components, and 1 part of titandiisopropoxybis (manufactured by Matsumoto Fine Chemical Co., Ltd.) as a crosslinking agent are put into a stainless steel reaction vessel equipped with a stirrer, a heater, a thermometer, a classifier and a nitrogen gas introducing tube, the mixture is subjected to polycondensation reaction while stirring under a nitrogen atmosphere at 230° C. for 7 hours, and a specific polyester resin 1 is synthesized by confirming that the product reaches the desired range of molecular weight and acid value.

The weight average molecular weight, glass transition temperature and softening temperature of the polyester resin A are measured by the aforementioned method.

The results are shown in Table 1.

-Polyester Resins B to I and Comparative Polyester Resins A to E-
Polyester resins B to I and comparative polyester resins A to E are synthesized in the same manner as in polyester resin A, except that the polyhydric alcoholic component and the polyvalent carboxylic acid component are changed according to Tables 1 and 2.

The weight average molecular weights, glass transition temperatures and softening temperatures of the polyester resins B to I and comparative polyester resins A to E are measured by the aforementioned method.

The results are shown in Tables 1 and 2.

Example 1

(Preparation of Toner Particles 1)
-Blending Amount-

| | |
|---|---|
| Polyester resin A | 100 parts |
| Magenta pigment (C.I. Pigment Red 57) | 3 parts |

The composition is kneaded using an extruder and pulverized using a surface pulverization type pulverizer. Thereafter, the particles are classified into fine and coarse particles using a wind power-type classifier (turbo classifier (TC-15 N), manufactured by Nisshin Engineering Inc.), and a process for obtaining the middle-sized particles is repeated three times to obtain magenta toner particles 1 having a volume average particle diameter of 8 μm.

(Preparation of Electrostatic Image Developer)
-Preparation of Toner- 0.5 parts of silica (trade name of 8812 manufactured by Nippon Aerosil Co., Ltd.) is added to toner particles 1 (100 parts), and mixed using a high-speed mixer to obtain a toner.

7 parts of toner 1 is added to 100 parts of a carrier including ferrite particles (particle diameter=50 μm) which are coated with the toner and a methyl methacrylate-styrene copolymer, and the mixture is mixed using a tumbler shaker mixer to obtain an electrostatic image developer.

The obtained electrostatic image developer is used to perform the following evaluations.

The results are shown in Table 3.

(Evaluation)
-Amount of Electric Charge-

The prepared developer is weighed by a glass bottle having a lid thereof, and the amount of electric charge (μC/g) of the toner is measured using a blow-off apparatus for measuring the amount of electric charge to obtain an amount of electric charge.

-Low-Temperature Fixability-

The low-temperature fixability of the prepared toner is examined as follows.

An image with a size of 40 mm×50 mm as a solid image, a toner amount of 1.5 mg/cm$^2$ and a mirror coating platinum paper (basis weight: 127 gsm) as a recording paper are used to perform the evaluation. Subsequently, a fixing machine of DocuPrint 02220 is modified such that the fixing temperature is variable, and the fixability is evaluated while increasing the fixation temperature gradually from 100° C.

For the low-temperature fixability, a good fixed image having no image defects caused by sticking in the mold is folded by using a plumb having a predetermined weight, and the degree of image defects in that portion is graded to define a fixing temperature equal to or higher than a predetermined level as the lowest fixing temperature, and use the temperature as an index for the low-temperature fixability.

The low-temperature fixability is defined as an allowable range at a lowest fixing temperature of 140° C. or lower.

-Heat Resistance (Powder Characteristics)-

The obtained toner is allowed to stand under the environment of a temperature of 53° C. and a humidity of 50% for 16 hours, and it is confirmed with the naked eye whether the aggregate of the toner is formed.

The criteria for evaluation are defined as follows.

Heat resistance means allowable ranges represented by B and A.

A: No aggregate is observed,

B: Aggregates are slightly observed, but are within an allowable range.

C: Many aggregates are observed and exceed an allowable range

Examples 2 to 9 and Comparative Examples 1 to 5

A toner and a developer are prepared in the same manner as in Example 1, except that the polyester resin 1 is changed according to Table 3, and evaluation is performed in the same manner as in Example 1.

The results are shown in Table 3.

TABLE 1

| | Polyester resin | A | B | C | D | E | F | G | H | I |
|---|---|---|---|---|---|---|---|---|---|---|
| Polyhydric alcoholic components | Bisphenol A type rosin diol 1 | 50 parts | 10 parts | 25 parts | 40 parts | 40 parts | 15 parts | 45 parts | 35 parts | 5 parts |
| | Biphenyl type rosin diol 1 | | | | | 10 parts | | 30 parts | | |
| | Bisphenol F type rosin diol 1 | | | | 25 parts | | | | | |
| | Adduct of 2 moles of propylene oxide to bisphenol A | | 40 parts | | | | | | 5 parts | 45 parts |
| | Hexane diol | | | | | 10 parts | 5 parts | 5 parts | 10 parts | |
| Polyvalent carboxylic acid components | Terephthalic acid | 10 parts | 15 parts | 10 parts | 10 parts | 10 parts | 25 parts | 10 parts | 10 parts | 10 parts |
| | Dodecenylsuccinic acid | 30 parts | 25 parts | | | 30 parts | 10 parts | 30 parts | 20 parts | 30 parts |
| | Sebacic acid | 10 parts | | 40 parts | 40 parts | | 15 parts | 10 parts | 5 parts | 10 parts |
| Titandiisopropoxybis | | 1 part | 1 part | 1 part | 1 part | 1 part | 1 part | 1 part | 1 part | 1 part |
| Weight average molecular weight (Mw) | | 20000 | 21000 | 20000 | 19000 | 20000 | 21000 | 20000 | 20000 | 20000 |
| Glass transition temperature (Tg) | | 60 | 61 | 60 | 60 | 59 | 60 | 60 | 60 | 59 |
| Softening temperature | | 112 | 115 | 114 | 111 | 115 | 115 | 113 | 116 | 113 |

TABLE 2

| Comparative polyester resin | | A | B | C | D | E |
|---|---|---|---|---|---|---|
| Polyhydric alcoholic components | Bisphenol A type rosin diol 1 | 35 parts | 30 parts | — | 15 parts | — |
| | Biphenyl type rosin diol 1 | — | — | — | 20 parts | — |
| | Bisphenol F type rosin diol 1 | — | — | — | — | — |
| | Adduct of 2 moles of propylene oxide to bisphenol A | — | — | — | — | 50 parts |
| | Hexane diol | 15 parts | 20 parts | — | 15 parts | — |
| | Comparative rosin diol 1 | — | — | 50 parts | — | — |
| Polyvalent carboxylic acid components | Terephthalic acid | 25 parts | 25 parts | 25 parts | 25 parts | 35 parts |
| | Dodecenylsuccinic acid | 25 parts | 25 parts | 25 parts | 10 parts | 15 parts |
| | Sebacic acid | — | — | — | 15 parts | — |
| Titandiisopropoxybis | | 1 part | 1 part | 1 part | 1 part | 1 part |
| Weight average molecular weight (Mw) | | 19000 | 20000 | 20000 | 21000 | 21000 |
| Glass transition temperature (Tg) | | 60 | 53 | 60 | 63 | 60 |
| Softening temperature | | 119 | 116 | 121 | 122 | 119 |

TABLE 3

| | Example 1 | Example 2 | Example 3 | Example 4 | Example 5 | Example 6 | Example 7 | Example 8 |
|---|---|---|---|---|---|---|---|---|
| Polyester resin | Resin A | Resin B | Resin C | Resin D | Resin E | Resin F | Resin G | Resin H |
| Amount of electric charge ($\mu$C/g) | 70 | 75 | 65 | 63 | 60 | 65 | 66 | 62 |
| Low-temperature fixability | 135 | 140 | 140 | 140 | 135 | 140 | 135 | 140 |
| Heat resistance (powder characteristics) | A | A | A | A | A | B | A | B |

| | Example 9 | Comparative Example 1 | Comparative Example 2 | Comparative Example 3 | Comparative Example 4 | Comparative Example 5 |
|---|---|---|---|---|---|---|
| Polyester resin | Resin I | Comparative Resin A | Comparative Resin B | Comparative Resin C | Comparative Resin D | Comparative Resin E |
| Amount of electric charge ($\mu$C/g) | 70 | 60 | 55 | 60 | 60 | 45 |
| Low-temperature fixability | 140 | 155 | 145 | 155 | 155 | 150 |
| Heat resistance (powder characteristics) | A | B | C | A | A | B |

From the above results, it is apparent that both low-temperature fixability and heat resistance are accomplished in the present embodiment, unlike Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyester resin for a toner, comprising:

a polycondensate of a polyvalent carboxylic acid component and a polyhydric alcoholic component, wherein the polyhydric alcoholic component contains a rosin diol represented by the following Formula (1) and a content of the rosin diol is 80 mole % to 100 mole % based on the total polyhydric alcoholic component:

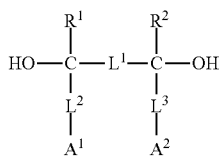

(1)

wherein each of $R^1$ and $R^2$ independently represents a hydrogen atom or a methyl group;
$L^1$ represents a divalent linking group having the following Formula (I);
each of $L^2$ and $L^3$ independently represents a divalent linking group selected from the group consisting of carbonyl groups, carboxyl groups, ether groups, sulfonyl groups, substituted or unsubstituted chained alkylene groups, substituted or unsubstituted cyclic alkylene groups, substituted or unsubstituted arylene groups, and combinations thereof; and
each of $A^1$ and $A^2$ independently represents a rosin ester group:

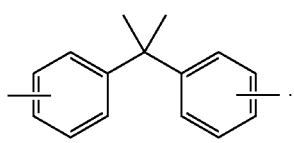

(I)

2. A polyester resin for a toner, comprising:
a polycondensate of a polyvalent carboxylic acid component and a polyhydric alcoholic component,
wherein the polyhydric alcoholic component contains a rosin diol represented by the following Formula (1) and one or more of an aromatic alcohol having a structure represented by Formulas (I), (II) and (III) except for the rosin diol,
a total content of the rosin diol and the aromatic alcohol is 80% by mole to 100% by mole based on a total polyhydric alcoholic component, and
a content of the rosin diol is 10% by mole to 80% by mole based on the total polyhydric alcoholic component:

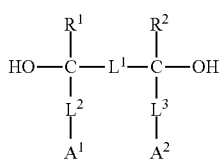

(1)

wherein, each of $R^1$ and $R^2$ independently represents a hydrogen atom or a methyl group,
$L^1$ represents a divalent linking group having the following Formula (I),
each of $L^2$ and $L^3$ independently represents a divalent linking group selected from the group consisting of carbonyl groups, carboxyl groups, ether groups, sulfonyl groups, substituted or unsubstituted chained alkylene groups, substituted or unsubstituted cyclic alkylene groups, substituted or unsubstituted arylene groups, and combinations thereof; and $A^1$ and $A^2$ represent a rosin ester group:

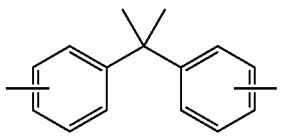

(I)

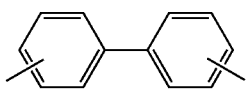

(II)

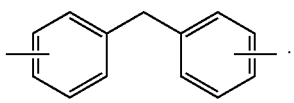

(III)

3. An electrostatic-image-developing toner, comprising the polyester resin for a toner according to claim 1.

4. An electrostatic image developer comprising the electrostatic-image-developing toner according to claim 3.

5. A toner cartridge accommodating the electrostatic-image-developing toner according to claim 3 and attached detachably to an image forming apparatus.

6. A process cartridge accommodating the electrostatic image developer according to claim 4, comprising:
a developing configured to develop an electrostatic image formed on a surface of an image holding member with the electrostatic image developer to form a toner image, and attached detachably to an image forming apparatus.

7. An image forming apparatus comprising:
an image holding member,
an electrically charging unit configured to electrically charge a surface of the image holding member,
an electrostatic image forming unit configured to form an electrostatic image on the surface of the image holding member,
a developing unit configured to accommodate the electrostatic image developer according to claim 4 and develop the electrostatic image with the electrostatic image developer to form a toner image,
a transferring unit configured to transfer the toner image to a recording medium, and
a fixing unit configured to fix the toner image on the recording medium.

8. An image forming method, comprising:
electrically charging a surface of an image holding member,
forming an electrostatic image on the surface of the image holding member,
developing the electrostatic image with the electrostatic image developer according to claim 4 to form a toner image,
transferring the toner image to a recording medium, and
fixing the toner image on the recording medium.

9. An electrostatic-image-developing toner, comprising the polyester resin for a toner according to claim 2.

10. An electrostatic image developer comprising the electrostatic-image-developing toner according to claim 9.

11. A toner cartridge accommodating the electrostatic-image-developing toner according to claim 9 and attached detachably to an image forming apparatus.

12. A process cartridge accommodating the electrostatic image developer according to claim 10, comprising:
a developing configured to develop an electrostatic image formed on a surface of an image holding member with the electrostatic image developer to form a toner image, and attached detachably to an image forming apparatus.

13. An image forming apparatus comprising:

an image holding member, an electrically charging unit configured to electrically charge a surface of the image holding member, an electrostatic image forming unit configured to form an electrostatic image on the surface of the image holding member, a developing unit configured to accommodate the electrostatic image developer according to claim 10 and develop the electrostatic image with the electrostatic image developer to form a toner image, a transferring unit configured to transfer the toner image to a recording medium, and a fixing unit configured to fix the toner image on the recording medium.

14. An image forming method, comprising:

electrically charging a surface of an image holding member, forming an electrostatic image on the surface of the image holding member, developing the electrostatic image with the electrostatic image developer according to claim 10 to form a toner image, transferring the toner image to a recording medium, and fixing the toner image on the recording medium.

\* \* \* \* \*